US009634875B2

(12) United States Patent
Porat

(10) Patent No.: US 9,634,875 B2
(45) Date of Patent: Apr. 25, 2017

(54) DATA AND PILOT SUB-CARRIER OR TONE DESIGN FOR OFDM/OFDMA IN WIRELESS COMMUNICATIONS

(71) Applicant: BROADCOM CORPORATION, Irvine, CA (US)

(72) Inventor: Ron Porat, San Diego, CA (US)

(73) Assignee: Avago Technologies General IP (Singapore) Pte. Ltd, Singapore (SG)

( * ) Notice: Subject to any disclaimer, the term of this patent is extended or adjusted under 35 U.S.C. 154(b) by 148 days.

(21) Appl. No.: 14/736,517

(22) Filed: Jun. 11, 2015

(65) Prior Publication Data
US 2015/0280953 A1  Oct. 1, 2015

Related U.S. Application Data

(63) Continuation-in-part of application No. 14/296,733, filed on Jun. 5, 2014.

(60) Provisional application No. 61/832,515, filed on Jun. 7, 2013, provisional application No. 61/832,541, filed on Jun. 7, 2013, provisional application No. 61/833,019, filed on Jun. 10, 2013, provisional
(Continued)

(51) Int. Cl.
*H04J 11/00* (2006.01)
*H04L 27/26* (2006.01)
*H04L 5/00* (2006.01)

(52) U.S. Cl.
CPC ........ *H04L 27/2602* (2013.01); *H04L 5/0007* (2013.01); *H04L 5/0044* (2013.01); *H04L 5/0053* (2013.01); *H04L 27/2627* (2013.01)

(58) Field of Classification Search
CPC ............. H04L 27/2602; H04L 27/2627; H04L 5/0007; H04L 5/0044; H04L 5/0053; H04L 12/4604; H04W 84/04; H04W 88/06
USPC ........................................................ 370/338
See application file for complete search history.

(56) References Cited

U.S. PATENT DOCUMENTS

| 7,869,341 B2 * | 1/2011 | Lim ...................... H04L 5/0048 370/204 |
| 2005/0124372 A1 * | 6/2005 | Lundby ............... H04W 52/146 455/522 |

(Continued)

*Primary Examiner* — Chi H Pham
*Assistant Examiner* — Robert Lopata
(74) *Attorney, Agent, or Firm* — Garlick & Markison; Shayne X. Short

(57) ABSTRACT

A wireless communication device (alternatively, device) includes a communication interface and a processor, among other possible circuitries, components, elements, etc. to support communications with other wireless communication device(s) and to generate and process signals for such communications. A device is configured to generate various orthogonal frequency division multiplexing (OFDM) and/or orthogonal frequency division multiple access (OFDMA) packets (e.g., frames, signals, etc.) that are based on any of a group of set of OFDM/A frame structures. Across the various OFDM/A frame structures, the ratio of pilot sub-carriers to data sub-carriers across resource units (RUs) of decreases as the total number of sub-carriers across the RUs increases. In addition, some of the OFDM/A frame structures include different total number of sub-carriers yet same number of pilot sub-carriers. The device is configured to perform adaptation among and between the various OFDM/A frame structures based on any one or more considerations.

20 Claims, 9 Drawing Sheets

Related U.S. Application Data application No. 61/864,855, filed on Aug. 12, 2013, provisional application No. 62/010,606, filed on Jun. 11, 2014, provisional application No. 62/017,195, filed on Jun. 25, 2014, provisional application No. 62/019,842, filed on Jul. 1, 2014, provisional application No. 62/041,753, filed on Aug. 26, 2014, provisional application No. 62/060,439, filed on Oct. 6, 2014, provisional application No. 62/075,591, filed on Nov. 5, 2014, provisional application No. 62/102,328, filed on Jan. 12, 2015, provisional application No. 62/154,036, filed on Apr. 28, 2015.

(56) References Cited

U.S. PATENT DOCUMENTS

| | | | |
|---|---|---|---|
| 2006/0023680 A1* | 2/2006 | Oh | H04B 7/0613 370/338 |
| 2008/0068980 A1* | 3/2008 | Lim | H04L 5/0048 370/208 |
| 2009/0220021 A1* | 9/2009 | Ihm | H04B 1/707 375/267 |
| 2009/0274174 A1* | 11/2009 | Hwang | H04W 72/0406 370/480 |
| 2009/0286497 A1* | 11/2009 | Akkarakaran | H04B 7/0848 455/226.3 |
| 2016/0301452 A1* | 10/2016 | Kwon | H04B 7/0421 |

* cited by examiner

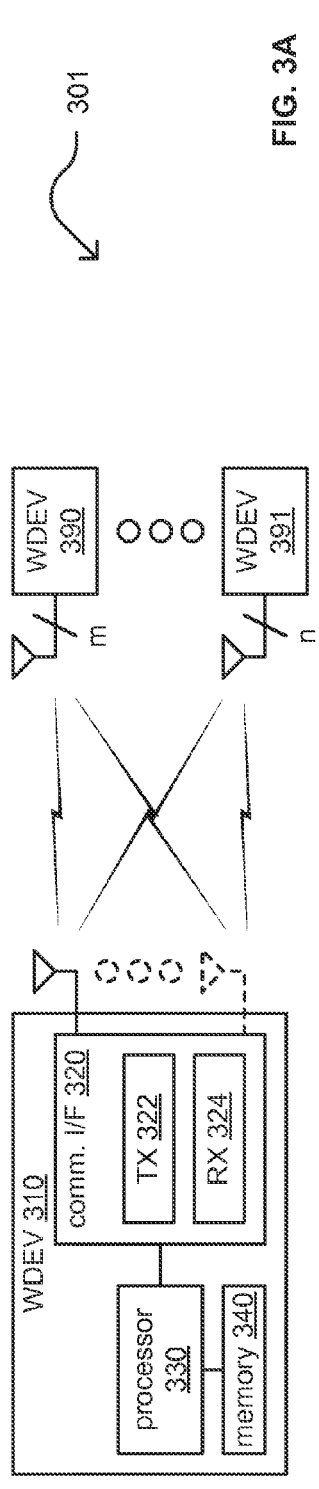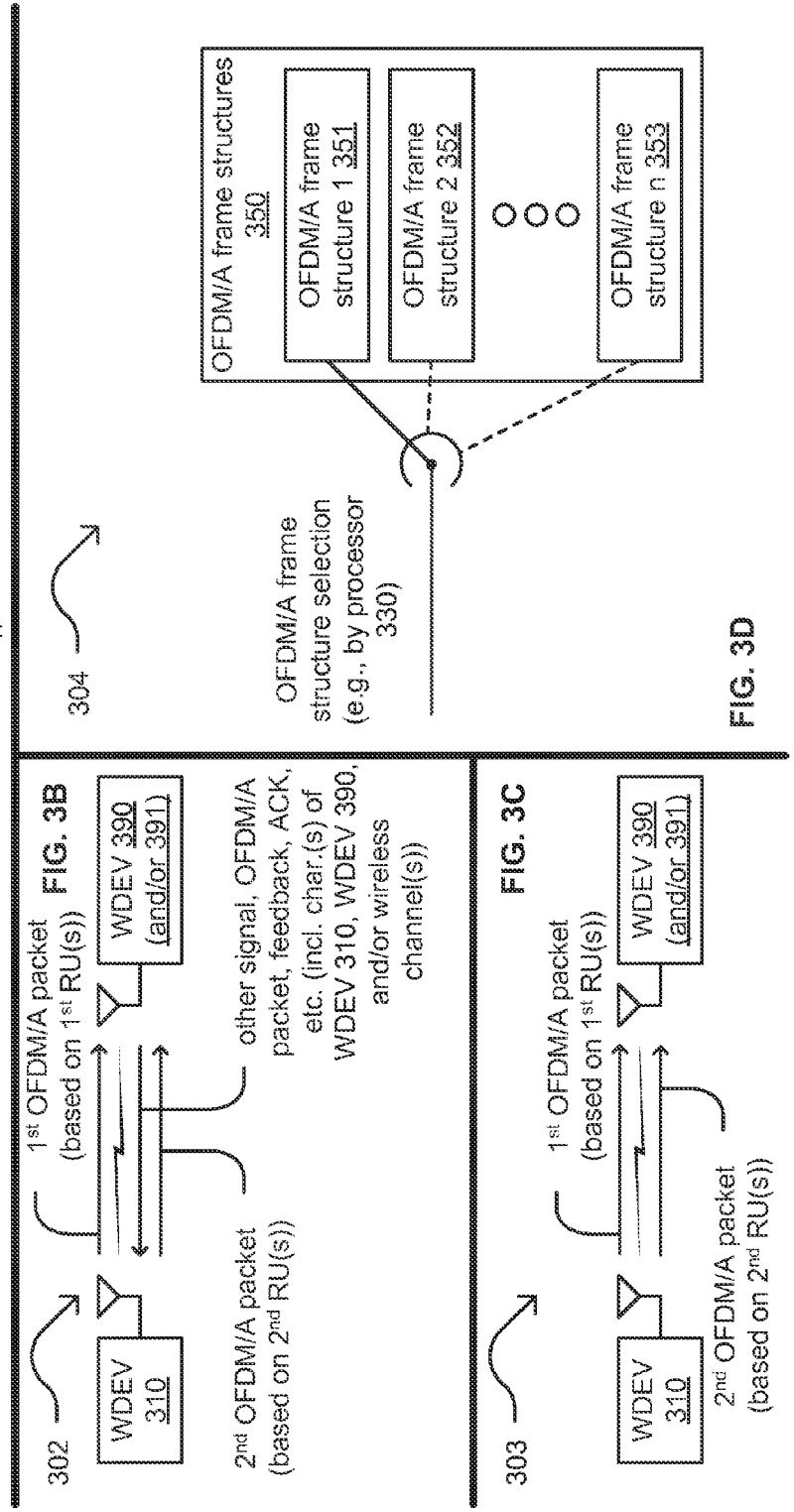

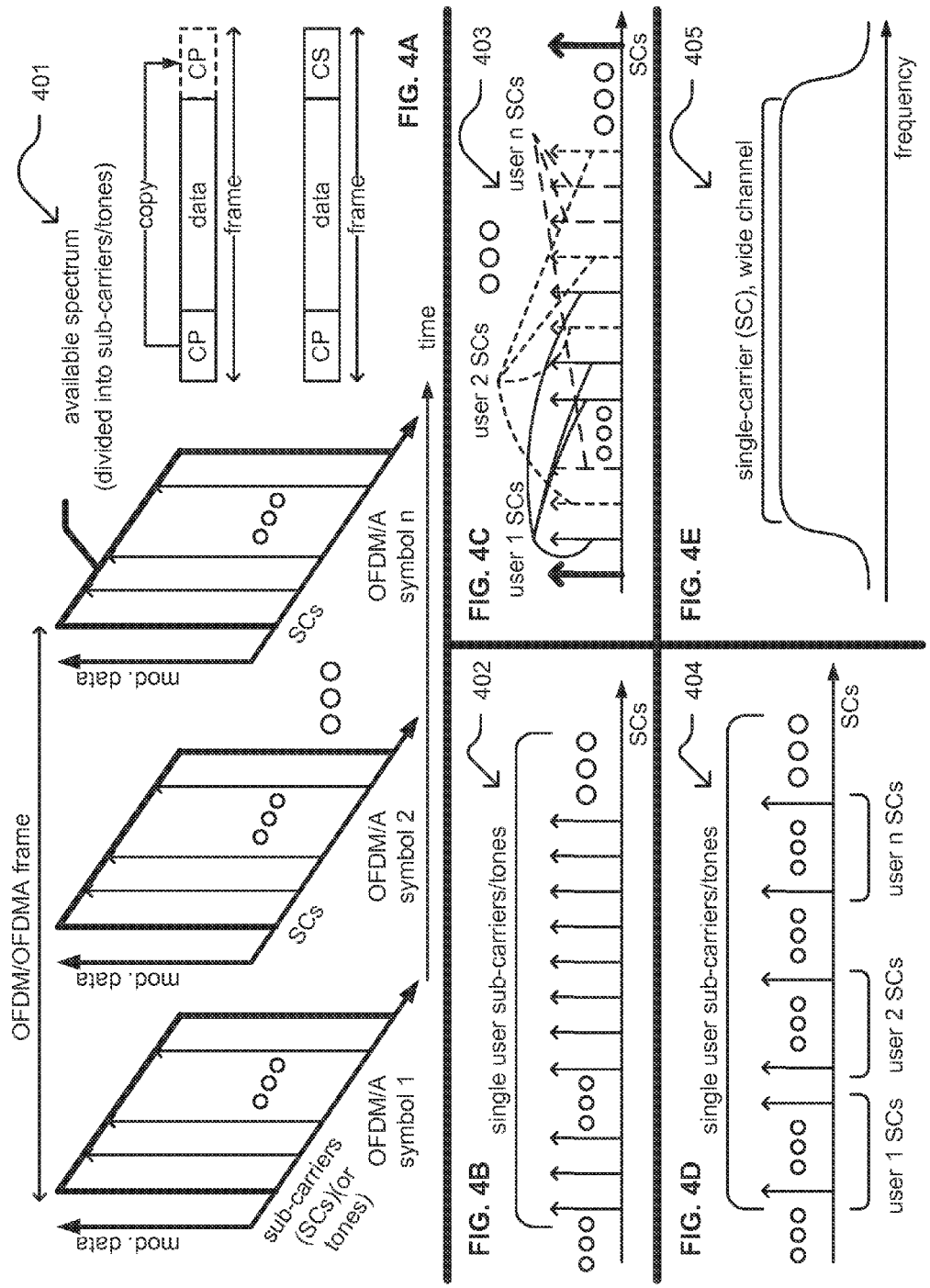

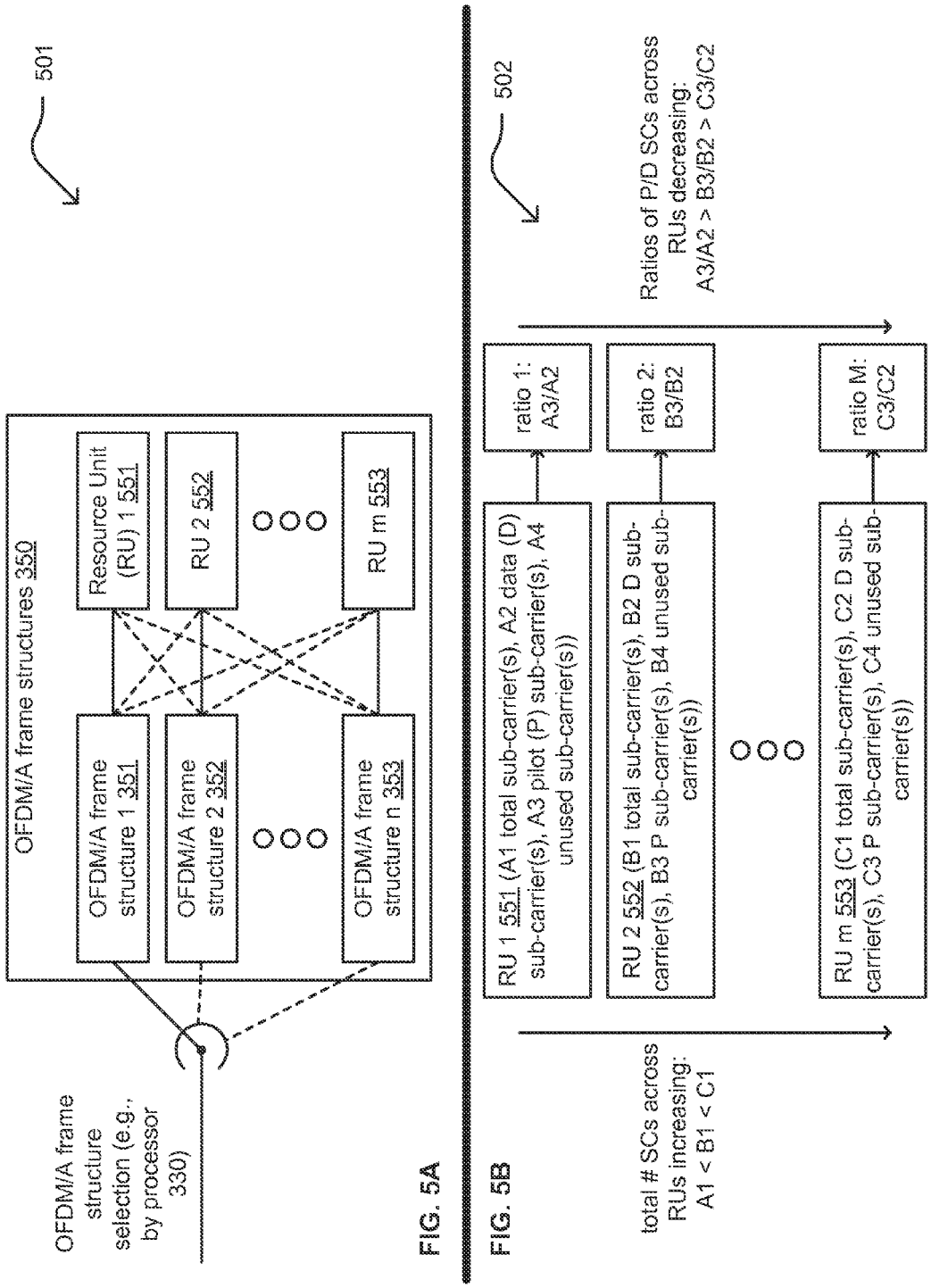

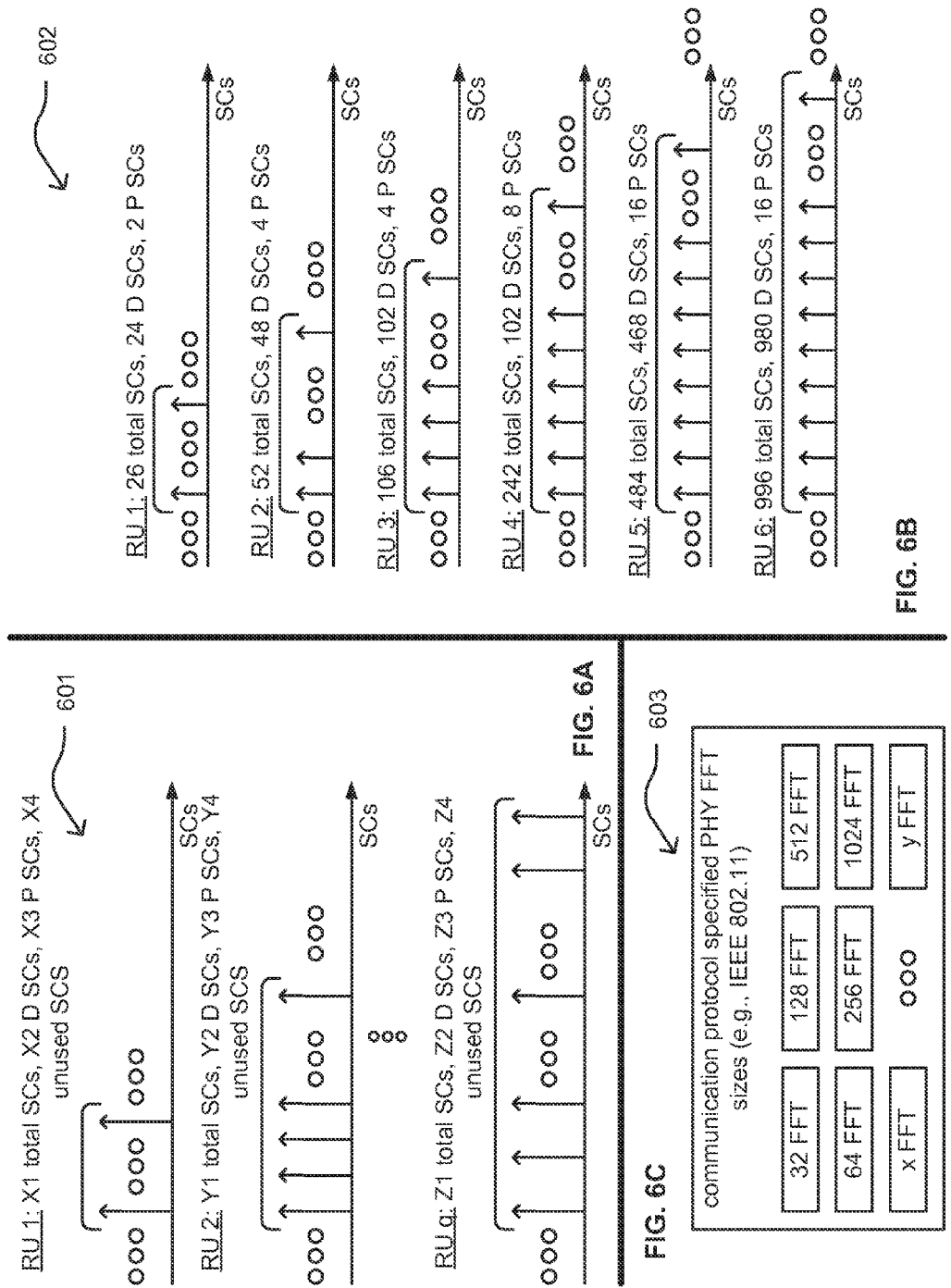

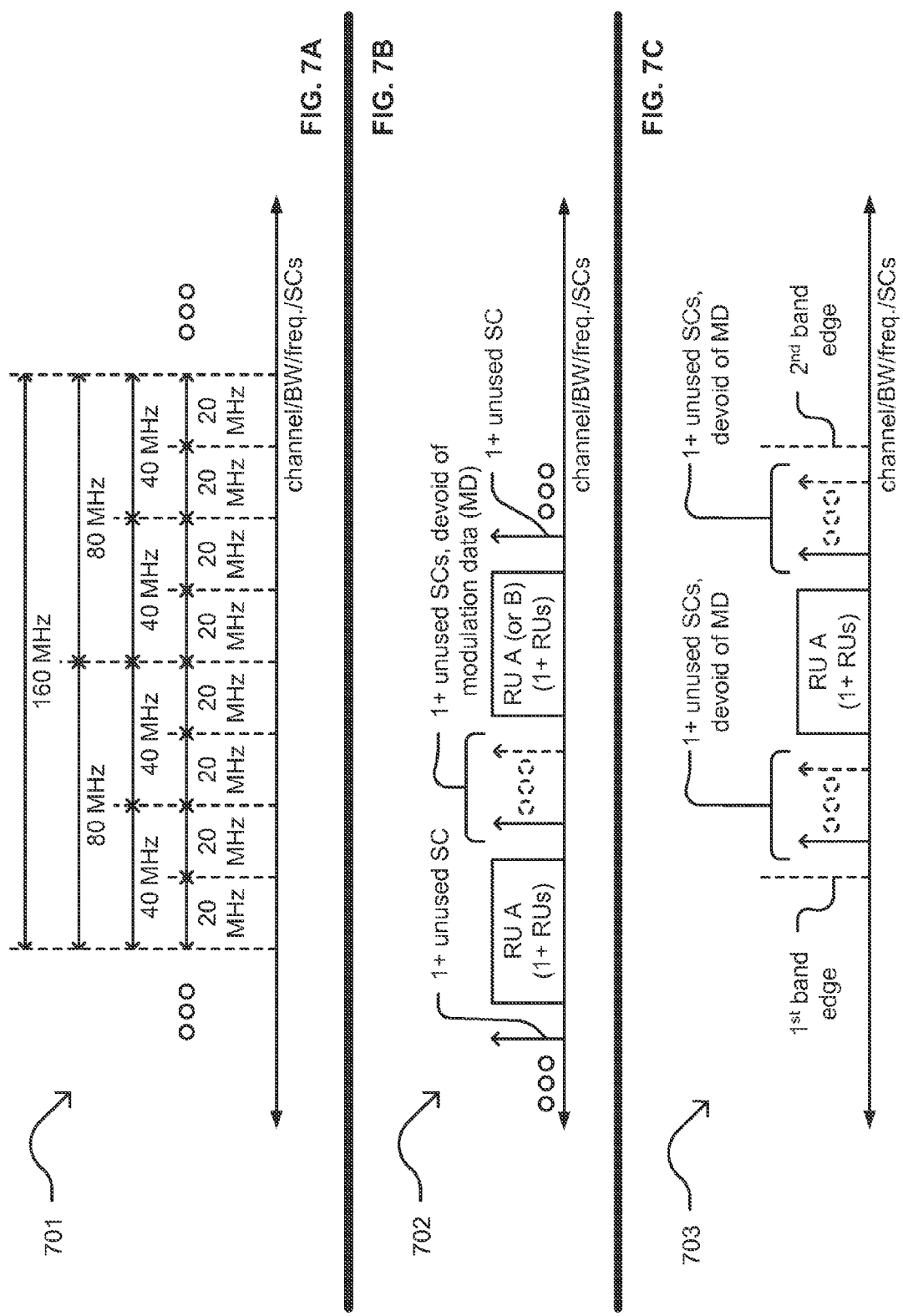

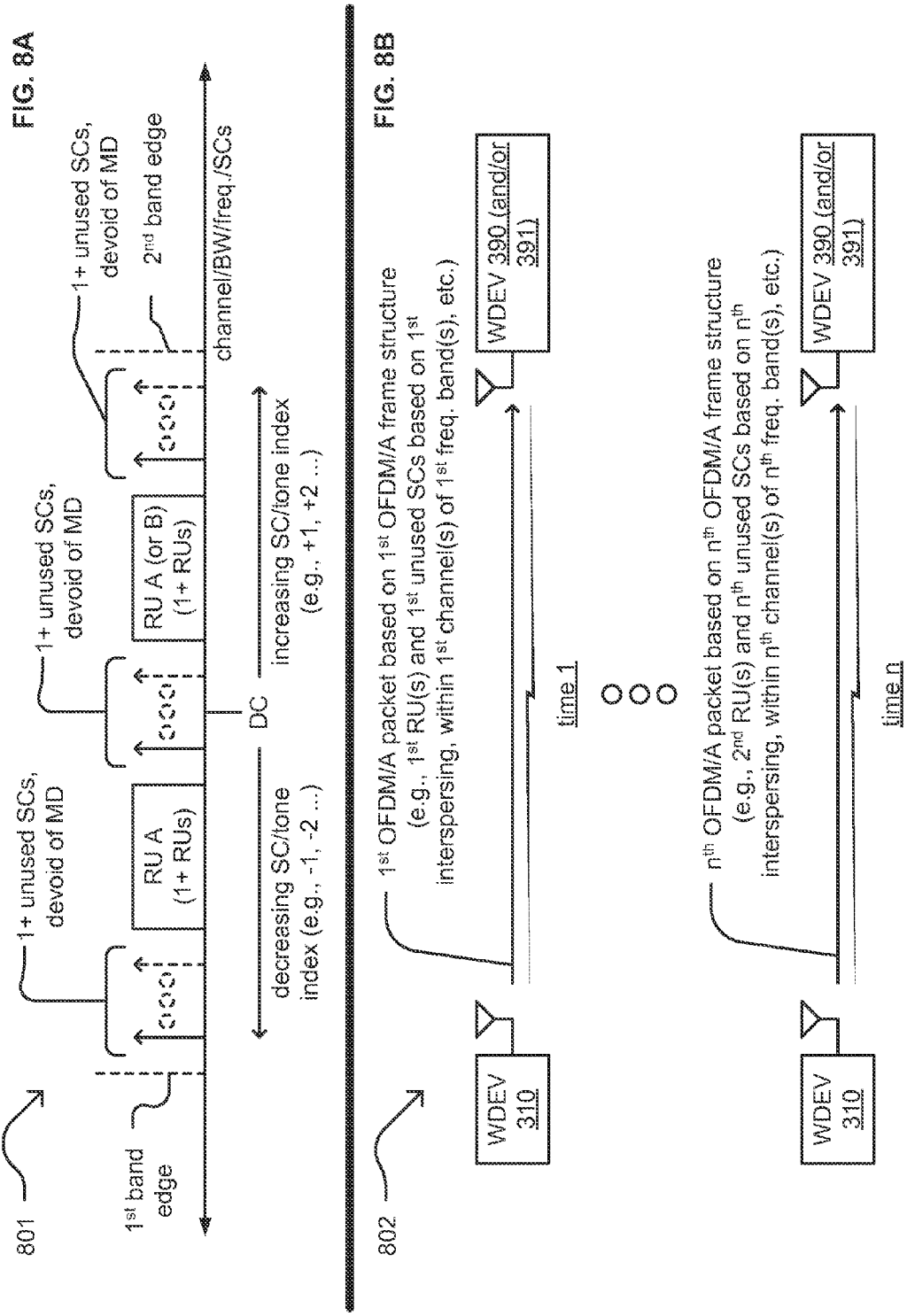

DATA AND PILOT SUB-CARRIER OR TONE DESIGN FOR OFDM/OFDMA IN WIRELESS COMMUNICATIONS

CROSS REFERENCE TO RELATED PATENTS/PATENT APPLICATIONS

Continuation-in-Part (CIP) Priority Claim, 35 U.S.C. §120

The present U.S. Utility Patent Application claims priority pursuant to 35 U.S.C. §120 as a continuation-in-part (CIP) of U.S. Utility application Ser. No. 14/296,733, entitled "Inter-AP coordination and synchronization within wireless communications," filed Jun. 5, 2014, pending, which claims priority pursuant to 35 U.S.C. §119(e) to U.S. Provisional Application No. 61/832,515, entitled "Coordinated beamforming and nulling within single user, multiple user, multiple access, and/or MIMO wireless communications," filed Jun. 7, 2013; U.S. Provisional Application No. 61/832,541, entitled "Inter-AP coordination and synchronization within single user, multiple user, multiple access, and/or MIMO wireless communications," filed Jun. 7, 2013; U.S. Provisional Application No. 61/833,019, entitled "Orthogonal frequency division multiple access (OFDMA) structures for high efficiency wireless communications," filed Jun. 10, 2013; and U.S. Provisional Application No. 61/864,855, entitled "Orthogonal frequency division multiple access (OFDMA) structures for high efficiency wireless communications," filed Aug. 12, 2013, all of which are hereby incorporated herein by reference in their entirety and made part of the present U.S. Utility Patent Application for all purposes.

PROVISIONAL PRIORITY CLAIMS

The present U.S. Utility Patent Application claims priority pursuant to 35 U.S.C. §119(e) to U.S. Provisional App. Ser. No. 62/010,606, entitled "Orthogonal frequency division multiple access (OFDMA) structures for high efficiency wireless communications," filed Jun. 11, 2014; U.S. Provisional App. Ser. No. 62/017,195, entitled "Data and pilot sub-carrier or tone design for OFDM/OFDMA in wireless communications," filed Jun. 25, 2014; U.S. Provisional App. Ser. No. 62/019,842, entitled "Orthogonal frequency division multiple access (OFDMA) structures for high efficiency wireless communications," filed Jul. 1, 2014; U.S. Provisional App. Ser. No. 62/041,753, entitled "Orthogonal frequency division multiple access (OFDMA) structures for high efficiency wireless communications," filed Aug. 26, 2014; U.S. Provisional App. Ser. No. 62/060,439, entitled "Orthogonal frequency division multiple access (OFDMA) structures for high efficiency wireless communications," filed Oct. 6, 2014; U.S. Provisional App. Ser. No. 62/075,591, entitled "Orthogonal frequency division multiple access (OFDMA) structures for high efficiency wireless communications," filed Nov. 5, 2014; U.S. Provisional App. Ser. No. 62/102,328, entitled "Orthogonal frequency division multiple access (OFDMA) structures for high efficiency wireless communications," filed Jan. 12, 2015; and U.S. Provisional App. Ser. No. 62/154,036, entitled "Orthogonal frequency division multiple access (OFDMA) structures for high efficiency wireless communications," filed Apr. 28, 2015, all of which are hereby incorporated herein by reference in their entirety and made part of the present U.S. Utility Patent Application for all purposes.

INCORPORATION BY REFERENCE

The following U.S. Utility Patent Application is also hereby incorporated herein by reference in their entirety and made part of the present U.S. Utility Patent Application for all purposes:

1. U.S. Utility application Ser. No. 14/736,479, entitled "Orthogonal frequency division multiple access (OFDMA) structures for high efficiency wireless communications," filed concurrently on Jun. 11, 2015, pending.

BACKGROUND

Technical Field

The present disclosure relates generally to communication systems; and, more particularly, to signal design and architecture within single user, multiple user, multiple access, and/or MIMO wireless communications.

Description of Related Art

Communication systems support wireless and wire lined communications between wireless and/or wire lined communication devices. The systems can range from national and/or international cellular telephone systems, to the Internet, to point-to-point in-home wireless networks and can operate in accordance with one or more communication standards. For example, wireless communication systems may operate in accordance with one or more standards including, but not limited to, IEEE 802.11x (where x may be various extensions such as a, b, n, g, etc.), Bluetooth, advanced mobile phone services (AMPS), digital AMPS, global system for mobile communications (GSM), etc., and/or variations thereof.

In some instances, wireless communication is made between a transmitter (TX) and receiver (RX) using single-input-single-output (SISO) communication. Another type of wireless communication is single-input-multiple-output (SIMO) in which a single TX processes data into radio frequency (RF) signals that are transmitted to a RX that includes two or more antennae and two or more RX paths.

Yet an alternative type of wireless communication is multiple-input-single-output (MISO) in which a TX includes two or more transmission paths that each respectively converts a corresponding portion of baseband signals into RF signals, which are transmitted via corresponding antennae to a RX. Another type of wireless communication is multiple-input-multiple-output (MIMO) in which a TX and RX each respectively includes multiple paths such that a TX parallel processes data using a spatial and time encoding function to produce two or more streams of data and a RX receives the multiple RF signals via multiple RX paths that recapture the streams of data utilizing a spatial and time decoding function.

There continues to be much room for improvement within such communication systems including a great deal of room for improvement to provide better architectures and designs for signaling, frame structures, etc. The prior art does not present adequate solutions for architectures and designs for signaling, frame structures, etc. to maximize throughput, usage of the communication medium, performance, efficiency, etc.

BRIEF DESCRIPTION OF THE SEVERAL VIEWS OF THE DRAWINGS

FIG. 3A is a diagram illustrating an example of communication between wireless communication devices.

FIG. 3B is a diagram illustrating another example of communication between wireless communication devices.

FIG. 3C is a diagram illustrating another example of communication between wireless communication devices.

FIG. 3D is a diagram illustrating an example of selection among different OFDM/A frame structures for use in communications between wireless communication devices.

FIG. 4A is a diagram illustrating an example of orthogonal frequency division multiplexing (OFDM) and/or orthogonal frequency division multiple access (OFDMA).

FIG. 4B is a diagram illustrating another example of OFDM and/or OFDMA.

FIG. 4C is a diagram illustrating another example of OFDM and/or OFDMA.

FIG. 4D is a diagram illustrating another example of OFDM and/or OFDMA.

FIG. 4E is a diagram illustrating an example of single-carrier (SC) signaling.

FIG. 5A is a diagram illustrating another example of selection among different OFDM/A frame structures for use in communications between wireless communication devices and specifically showing OFDM/A frame structures corresponding to one or more resource units (RUs).

FIG. 5B is a diagram illustrating an example of various types of different resource units (RUs).

FIG. 6A is a diagram illustrating another example of various types of different RUs.

FIG. 6B is a diagram illustrating another example of various types of different RUs.

FIG. 6C is a diagram illustrating an example of various types of communication protocol specified physical layer (PHY) fast Fourier transform (FFT) sizes.

FIG. 7A is a diagram illustrating an example of different channel bandwidths and relationship there between.

FIG. 7B is a diagram illustrating an example of different OFDM/A packets based on different OFDM/A frame structures with placement of one or more unused sub-carriers therein.

FIG. 7C is a diagram illustrating another example of different OFDM/A packets based on different OFDM/A frame structures with placement of one or more unused sub-carriers therein.

FIG. 8A is a diagram illustrating another example of different OFDM/A packets based on different OFDM/A frame structures with placement of one or more unused sub-carriers therein.

FIG. 8B is a diagram illustrating another example of communication between wireless communication devices.

DETAILED DESCRIPTION

Figure 1:
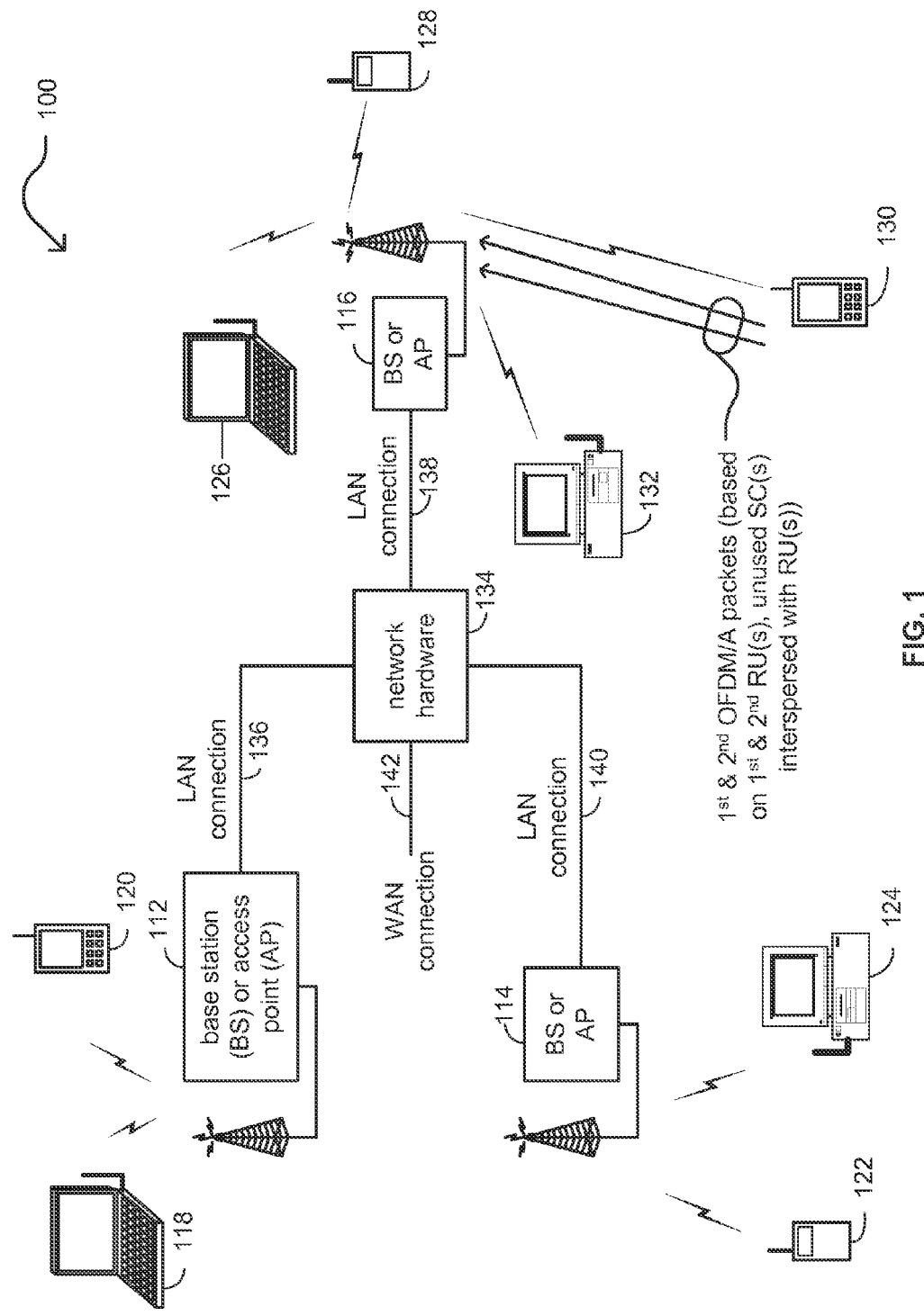
FIG. 1 is a diagram illustrating an embodiment of a wireless communication system.

FIG. 1 is a diagram illustrating an embodiment of a wireless communication system 100. The wireless communication system 100 includes base stations and/or access points 112-116, wireless communication devices 118-132 (e.g., wireless stations (STAs)), and a network hardware component 134. The wireless communication devices 118-132 may be laptop computers, or tablets, 118 and 126, personal digital assistants 120 and 130, personal computers 124 and 132 and/or cellular telephones 122 and 128. The details of an embodiment of such wireless communication devices are described in greater detail with reference to FIG. 3A.

The base stations (BSs) or access points (APs) 112-116 are operably coupled to the network hardware 134 via local area network connections 136, 138, and 140. The network hardware 134, which may be a router, switch, bridge, modem, system controller, etc., provides a wide area network connection 142 for the communication system 100. Each of the base stations or access points 112-116 has an associated antenna or antenna array to communicate with the wireless communication devices in its area. Typically, the wireless communication devices register with a particular base station or access point 112-116 to receive services from the communication system 100. For direct connections (i.e., point-to-point communications), wireless communication devices communicate directly via an allocated channel.

Any of the various wireless communication devices (WDEVs) 118-132 and BSs or APs 112-116 may include a processor and a communication interface to support communications with any other of the wireless communication devices 118-132 and BSs or APs 112-116. In an example of operation, a processor and a communication interface implemented within one of the devices (e.g., any one of the WDEVs 118-132 and BSs or APs 112-116) are configured to process at least one signal received from and/or to generate at least one signal to be transmitted to another one of the devices (e.g., any other one of the WDEVs 118-132 and BSs or APs 112-116). At least one of the processor or the communication interface implemented within one of the devices (e.g., any one of the WDEVs 118-132 and BSs or APs 112-116) is configured to process at least one signal received from and/or to generate at least one signal to be transmitted to another one of the devices (e.g., any other one of the WDEVs 118-132 and BSs or APs 112-116).

Note that general reference to a communication device, such as a wireless communication device (e.g., WDEVs) 118-132 and BSs or APs 112-116 in FIG. 1, or any other communication devices and/or wireless communication devices may alternatively be made generally herein using the term 'device' (e.g., with respect to FIG. 2 below, "device 210" when referring to "wireless communication device 210" or "WDEV 210," or "devices 210-234" when referring to "wireless communication devices 210-234"; or with respect to FIG. 3 below, use of "device 310" may alternatively be used when referring to "wireless communication device 310", or "devices 390 and 391 (or 390-391)" when referring to wireless communication devices 390 and 391 or WDEVs 390 and 391). Generally, such general references or designations of devices may be used interchangeably.

The processor and the communication interface of any one of the various devices, WDEVs 118-132 and BSs or APs 112-116, may be configured to support communications with any other of the various devices, WDEVs 118-132 and BSs or APs 112-116. At least one of the processor or the communication interface of any one of the various devices, WDEVs 118-132 and BSs or APs 112-116, may be configured to support communications with any other of the various devices, WDEVs 118-132 and BSs or APs 112-116. Such communications may be uni-directional or bi-directional between devices. Also, such communications may be uni-directional between devices at one time and bi-directional between those devices at another time.

In an example of operation, the BS or AP 116 includes a communication interface; and a processor such that one or both of the processor and the communication interface is/are configured to support communications with any other of the devices (e.g., WDEVs 118-132 and BSs or APs 112-114) based on any of a plurality of orthogonal frequency division multiple access (OFDMA) frame structures. More detail regarding OFDMA is described below, and note that orthogonal frequency division multiplexing (OFDM) is a subset of OFDMA (e.g., an OFDMA frame structure including modulation data intended for one recipient, and reference to OFDMA or OFDM/A includes both OFDM and OFDMA). With respect to these OFDMA frame structures, ratio of pilot sub-carriers to data sub-carriers across resource units (RUs) of the plurality of OFDMA frame structures decreases as total sub-carriers across the RUs of the plurality of OFDMA frame structures increases.

In an example of operation, the BS or AP 116 supports communications with any of the other devices (e.g., WDEVs 118-132 and BSs or APs 112-114) based on any of a number of OFDMA frame structures. Considering these OFDMA frame structures, the ratio of the number of pilot sub-carriers to the number of data sub-carriers across resource units (RUs) of the OFDMA frame structures decreases as the number of total sub-carriers across the RUs of the OFDMA frame structures increases. The BS or AP 116 generates an OFDMA packet based on an OFDMA frame structure that includes a set of RUs and a set of unused sub-carriers that are devoid of modulation data. In some examples, at least some RUs of the set of RUs include a respective common number of contiguous sub-carriers, and the set of unused sub-carriers are interspersed with the set of RUs. For example, one or more unused sub-carriers are interspersed with the various RUs (e.g., in between two RUs, between an RU and a band edge, located at DC, to maximize separation between RUs, etc.). The BS or AP 116 then transmits the OFDMA packet to at least one other wireless communication device (e.g., at least device 130).

In even other examples, the BS or AP 116 generates the first OFDMA packet based on the first OFDMA frame structure, such that the first OFDMA packet includes first data intended for a first other wireless communication device (e.g., WDEV 130) and second data intended for a second other wireless communication device (e.g., WDEV 132), and the BS or AP 116 then transmits the first OFDMA packet to the first other wireless communication device (e.g., WDEV 130) and the second other wireless communication device (e.g., WDEV 132).

In another example of operation, the BS or AP 116 generates a first OFDMA packet based on a first OFDMA frame structure that includes a set of RUs and a set of unused sub-carriers that are devoid of modulation data located within a frequency band. In some examples, at least some RUs of the set of RUs include a respective common number of contiguous sub-carriers, wherein the set of unused sub-carriers are interspersed with the set of RUs. Also, in some examples, a first unused sub-carrier of the set of unused sub-carriers is located at a first band edge of the frequency band, and a second unused sub-carrier of the set of unused sub-carriers is located at a second band edge of the frequency band. The BS or AP 116 then transmits the first OFDMA packet to a first other wireless communication device (e.g., device 130). The BS or AP 116 then generates a second OFDMA packet based on a second OFDMA frame structure that includes a single RU that includes another number of contiguous sub-carriers, and transmits the second OFDMA packet to at least one of the first other wireless communication device (e.g., device 130) or a second other wireless communication device (e.g., device 122).

In another example of operation, the BS or AP 116 generates the OFDMA packet to include a first unused sub-carrier of the set of unused sub-carriers that is adjacent to a first RU of the set of RUs that is adjacent to at least one unused sub-carrier of the set of unused sub-carriers that is adjacent to a second RU of the set of RUs that is adjacent to a second unused sub-carrier of the set of unused sub-carriers.

In another example of operation, the BS or AP 116 generates the OFDMA packet to include the set of RUs located within a frequency band. Within such a frequency band, at least one unused sub-carrier of the set of unused sub-carriers may be located approximately at DC of the frequency band. Also, within such a frequency band, a first unused sub-carrier of the set of unused sub-carriers may be located at a first band edge of the frequency band, and a second unused sub-carrier of the set of unused sub-carriers is located at a second band edge of the frequency band.

Note also that the BS or AP 116 can be configured to generate and transmit the various OFDMA packets based on any of a number of different physical layer (PHY) fast Fourier transform (FFT) sizes as specified within any of a number of different communication protocols (e.g., PHY FFT sizes such as 32, 64, 128, 256, 512, 1024, and/or other sizes).

Figure 2:
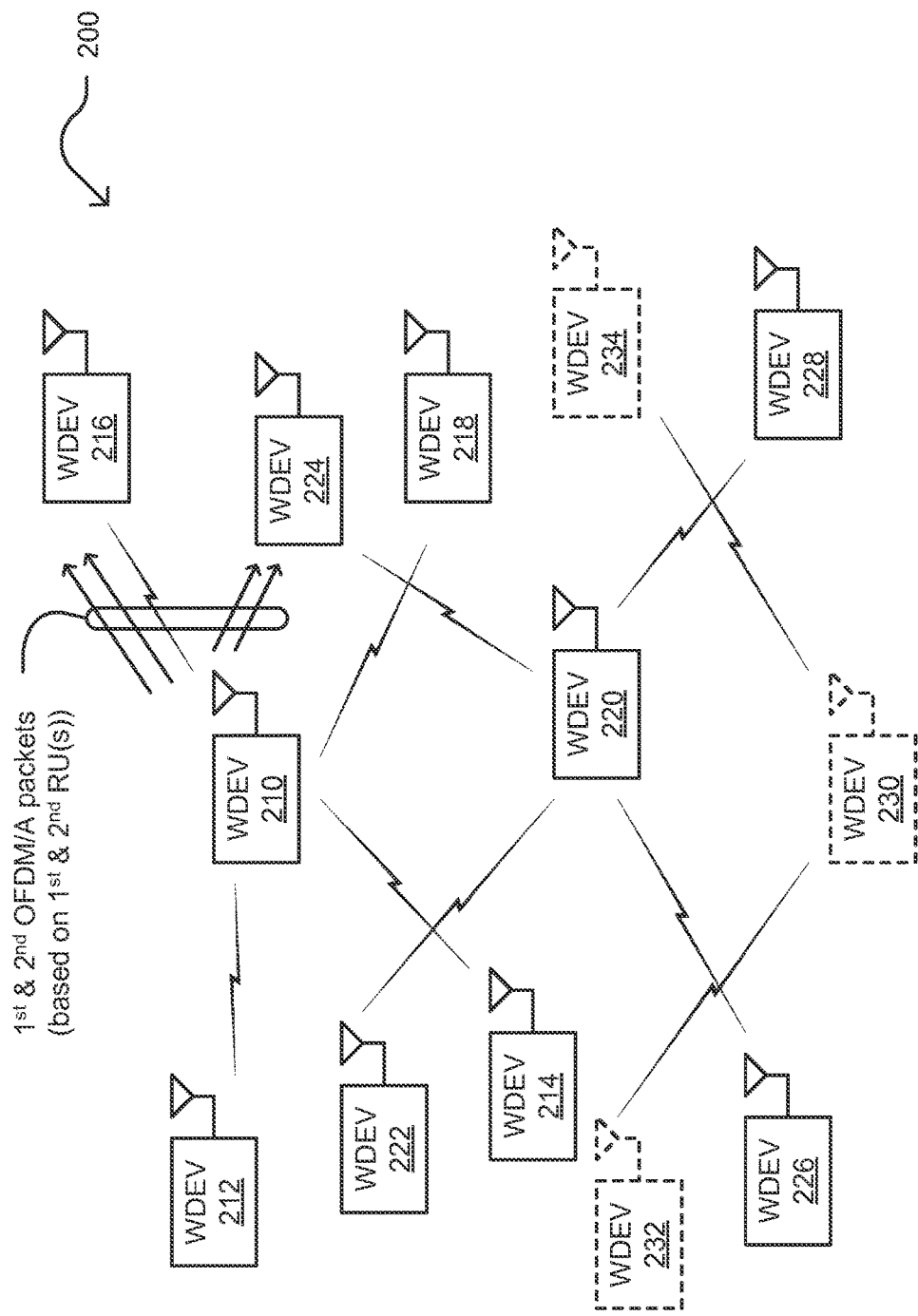
FIG. 2 is a diagram illustrating an embodiment of dense deployment of wireless communication devices.

FIG. 2 is a diagram illustrating an embodiment 200 of dense deployment of wireless communication devices (shown as WDEVs in the diagram). Any of the various WDEVs 210-234 may be access points (APs) or wireless stations (STAs). For example, WDEV 210 may be an AP or an AP-operative STA that communicates with WDEVs 212, 214, 216, and 218 that are STAs. WDEV 220 may be an AP or an AP-operative STA that communicates with WDEVs 222, 224, 226, and 228 that are STAs. In certain instances, at least one additional AP or AP-operative STA may be deployed, such as WDEV 230 that communicates with WDEVs 232 and 234 that are STAs. The STAs may be any type of one or more wireless communication device types including wireless communication devices 118-132, and the APs or AP-operative STAs may be any type of one or more wireless communication devices including as BSs or APs 112-116. Different groups of the WDEVs 210-234 may be partitioned into different basic services sets (BSSs). In some instances, at least one of the WDEVs 210-234 are included within at least one overlapping basic services set (OBSS) that cover two or more BSSs. As described above with the association of WDEVs in an AP-STA relationship, one of the WDEVs may be operative as an AP and certain of the WDEVs can be implemented within the same basic services set (BSS).

This disclosure presents novel architectures, methods, approaches, etc. that allow for improved spatial re-use for next generation WiFi or wireless local area network (WLAN) systems. Next generation WiFi systems are expected to improve performance in dense deployments where many clients and APs are packed in a given area (e.g., which may be an area [indoor and/or outdoor] with a high density of devices, such as a train station, airport, stadium, building, shopping mall, arenas, convention centers, colleges, downtown city centers, etc. to name just some examples). Large numbers of devices operating within a given area can be problematic if not impossible using prior technologies.

In an example of operation, the WDEV 210 supports communications based on any of a number of OFDMA frame structures. Within these OFDMA frame structures, the ratio of pilot sub-carriers to data sub-carriers across resource units (RUs) of the OFDMA frame structures decreases as total sub-carriers across the RUs of the OFDMA frame structures increases. The WDEV 210 generates an OFDMA packet based on an OFDMA frame structure that includes a set of RUs and a set of unused sub-carriers that are devoid of modulation data. At least some RUs of the set of RUs include a respective common number of contiguous sub-carriers, and the set of unused sub-carriers are interspersed with the set of RUs. The WDEV 210 then transmits the OFDMA packet to at least one other wireless communication device (e.g., WDEV 216).

In other examples, the WDEV 210 receives feedback from a first other wireless communication device (e.g., WDEV 216) and/or a second other wireless communication device (e.g., WDEV 224) and processes that feedback to determine information for use in selecting the another OFDMA frame structure for use to generate another OFDMA packet. The WDEV 210 then transmits this another OFDMA packet to the first other wireless communication device (e.g., WDEV 216) and/or the second other wireless communication device (e.g., WDEV 224).

FIG. 3A is a diagram illustrating an example 301 of communication between wireless communication devices. A wireless communication device 310 (e.g., which may be any one of devices 118-132 as with reference to FIG. 1) is in communication with another wireless communication device 390 via a transmission medium. The wireless communication device 310 includes a communication interface 320 to perform transmitting and receiving of at least one packet or frame (e.g., using a transmitter 322 and a receiver 324) (note that general reference to packet or frame may be used interchangeably).

Generally speaking, the communication interface 320 is implemented to perform any such operations of an analog front end (AFE) and/or physical layer (PHY) transmitter, receiver, and/or transceiver. Examples of such operations may include any one or more of various operations including conversions between the frequency and analog or continuous time domains (e.g., such as the operations performed by a digital to analog converter (DAC) and/or an analog to digital converter (ADC)), gain adjustment including scaling, filtering (e.g., in either the digital or analog domains), frequency conversion (e.g., such as frequency upscaling and/or frequency downscaling, such as to a baseband frequency at which one or more of the components of the device 310 operates), equalization, pre-equalization, metric generation, symbol mapping and/or de-mapping, automatic gain control (AGC) operations, and/or any other operations that may be performed by an AFE and/or PHY component within a wireless communication device.

The wireless communication device 310 also includes a processor 330, and an associated memory 340, to execute various operations including interpreting at least one signal, symbol, packet, and/or frame transmitted to wireless communication device 390 and/or received from the wireless communication device 390 and/or wireless communication device 391. The wireless communication devices 310 and 390 (and/or 391) may be implemented using at least one integrated circuit in accordance with any desired configuration or combination of components, modules, etc. within at least one integrated circuit. Also, the wireless communication devices 310, 390, and/or 391 may each include one or more antennas for transmitting and/or receiving of at least one packet or frame (e.g., WDEV 390 may include m antennae, and WDEV 391 may include n antennae).

FIG. 3B is a diagram illustrating another example of communication between wireless communication devices. In an example of operation, the device 310 includes the processor 330 and the communication interface 320 such that one or both are configured to perform various functions and operations. In an example of operation, the device 310 includes the processor 330 and the communication interface 320 such that one or both are configured to perform various functions and operations. The device 310 supports communications based on any of a number of OFDMA frame structures. The ratio of pilot sub-carriers to data sub-carriers across RUs of the OFDMA frame structures decreases as total sub-carriers across the RUs of the OFDMA frame structures increases. The device 310 generates an OFDMA packet based on an OFDMA frame structure that includes a set of RUs and a set of unused sub-carriers that are devoid of modulation data. In some examples, at least some RUs of the set of RUs include a respective common number of contiguous sub-carriers, and wherein the set of unused sub-carriers are interspersed with the set of RUs. The device 310 then transmits the OFDMA packet to at least one other wireless communication device (e.g., device 390 and/or device 391).

In another example, the device 310 generates a first OFDMA packet based on a first OFDMA frame structure and transmits the first OFDMA packet to device 390. The device 310 then receives, from the device 390, feedback that specifies at least one characteristic that corresponds to at least one wireless communication channel between the device 310 and the device 390. The device 310 then selects a second OFDMA frame structure based on the at least one characteristic. The device 310 then generates a second OFDMA packet based on the second OFDMA frame structure and transmits the second OFDMA packet to the device 390.

Examples of such characteristic include any one or more of signal to noise ratio (SNR) of at least one wireless communication channel between the device 310 and the device 390, channel estimation of the at least one wireless communication channel based on reception of the first OFDMA packet by the at least one other wireless communication device (e.g., device 390), a frequency band selected by the at least one other wireless communication device (e.g., device 390) for use in subsequent communications; and a frequency sub-band selected by the at least one other wireless communication device (e.g., device 390) for use in subsequent communications, etc.

In some examples, the first OFDMA frame structure includes a first RU of first contiguous sub-carriers that includes first data sub-carriers and first pilot sub-carriers, and the second OFDMA frame structure includes a second RU of second contiguous sub-carriers that includes second data sub-carriers and second pilot sub-carriers such that the second RU includes more sub-carriers than the first RU. A first ratio of the first pilot sub-carriers to the first data sub-carriers within the first RU is greater than a second ratio of the second pilot sub-carriers to the second data sub-carriers within the second RU.

In another example, the device 310 generates the first OFDMA packet based on the first OFDMA frame structure that includes first data intended for a device 390 and second data intended for a device 391 and transmits the first OFDMA packet to the device 390 and the device 391.

In another example, the device 310 generates the first OFDMA packet based on the first OFDMA frame structure that includes a first RUs based on the first OFDMA frame structure that substantially occupy a frequency band and generates the second OFDMA packet based on the second OFDMA frame structure that includes a second RUs based on the second OFDMA frame structure that substantially occupy the frequency band (e.g., the same frequency band) such that the second RUs includes fewer RUs than the first RUs. Note that the first and second RUs may alternatively be included in different frequency bands, in partially common/overlapping frequency bands, etc.

In general, a RU may be viewed as a set of sub-carriers, and the OFDMA frame structures may be implemented using any number of RUs having any number of sizes. In one example, a first RU includes 26 contiguous sub-carriers that include 24 data sub-carriers, and 2 pilot sub-carriers; a second RU includes 52 contiguous sub-carriers that include 48 data sub-carriers, and 4 pilot sub-carriers; a third RU includes 106 contiguous sub-carriers that include 102 data sub-carriers, and 4 pilot sub-carriers; a fourth RU includes 242 contiguous sub-carriers that include 234 data sub-carriers, and 8 pilot sub-carriers; a fifth RU includes 484 contiguous sub-carriers that include 468 data sub-carriers, and 16 pilot sub-carriers; and a sixth RU includes 996 contiguous sub-carriers that include 980 data sub-carriers, and 16 pilot sub-carriers.

In another example, the device 310 generates and transmits the first OFDMA packet based on a first physical layer (PHY) fast Fourier transform (FFT) size as specified within a communication protocol and generates and transmits the second OFDMA packet based on a second PHY FFT size that is specified within the communication protocol. Some examples of PHY FFT sizes, such as based on IEEE 802.11, include PHY FFT sizes such as 32, 64, 128, 256, 512, 1024, and/or other sizes. Note that the devices 310, 390, and/or 391 may be any types of devices such as access points (APs), wireless stations (STAs), etc. including any of the devices described with reference to FIG. 1.

FIG. 3C is a diagram illustrating another example of communication between wireless communication devices. In an example of operation, the device 310 generates a first OFDMA packet based on a first OFDMA frame structure of the number of OFDMA frame structures that includes a set of RUs and a set of unused sub-carriers that are devoid of modulation data located within a frequency band. In some examples, at least some RUs of the set of RUs include a respective common number of contiguous sub-carriers. Also, in some examples, the set of unused sub-carriers are interspersed with the set of RUs such that a first unused sub-carrier of the set of unused sub-carriers is located at a first band edge of the frequency band, and a second unused sub-carrier of the set of unused sub-carriers is located at a second band edge of the frequency band. The device 310 then transmits the first OFDMA packet to a first other wireless communication device (e.g., device 390). The device 310 then generates a second OFDMA packet based on a second OFDMA frame structure of the number of OFDMA frame structures that includes a single RU that includes another number of contiguous sub-carriers. The device 310 then transmits the second OFDMA packet to the first other wireless communication device (e.g., device 390) and/or the second other wireless communication device (e.g., device 391).

FIG. 3D is a diagram illustrating an example of selection among different OFDM/A frame structures for use in communications between wireless communication devices. A device (e.g., device 310) is configured to select any of a number of OFDM/A frame structures 350 (e.g., including OFDM/A frame structure 1 351, OFDM/A frame structure 2 352, up to OFDM/A frame structure n 353, where n is any positive integer greater than or equal to 2). In some implementations, the OFDM/A frame structures 350 include only two different OFDM/A frame structures (e.g., OFDM/A frame structure 1 351 and OFDM/A frame structure 2 352). In some implementations, the OFDM/A frame structures 350 include only three different OFDM/A frame structures (e.g., OFDM/A frame structure 1 351, OFDM/A frame structure 2 352, and an OFDM/A frame structure 3). In general, any number of OFDM/A frame structures may be included and certain of the OFDM/A frame structures may have some commonality in structure (e.g., similarly located and/or aligned RUs, unused sub-carriers, pilot tones, etc.).

In some examples, a device (e.g., device 310) is configured to select among and between the various OFDM/A frame structures 350 based on any number of considerations (e.g., feedback from another device, remote operating condition of the device 310, local operating condition of the device 390, assessment of channel condition(s), etc.).

FIG. 4A is a diagram illustrating an example 401 of orthogonal frequency division multiplexing (OFDM) and/or orthogonal frequency division multiple access (OFDMA). OFDM's modulation may be viewed as dividing up an available spectrum into a plurality of narrowband sub-carriers (e.g., relatively lower data rate carriers). The sub-carriers are included within an available frequency spectrum portion or band. This available frequency spectrum is divided into the sub-carriers or tones used for the OFDM or OFDMA symbols and packets/frames. Note that sub-carrier and tone may be used interchangeably. Typically, the frequency responses of these sub-carriers are non-overlapping and orthogonal. Each sub-carrier may be modulated using any of a variety of modulation coding techniques (e.g., as shown by the vertical axis of modulated data).

A communication device may be configured to perform encoding of one or more bits to generate one or more coded bits used to generate the modulation data (or generally, data). For example, a processor and the communication interface of a communication device may be configured to perform forward error correction (FEC) and/or error correction code (ECC) of one or more bits to generate one or more coded bits. Examples of FEC and/or ECC may include turbo code, convolutional code, turbo trellis coded modulation (TTCM), low density parity check (LDPC) code, Reed-Solomon (RS) code, BCH (Bose and Ray-Chaudhuri, and Hocquenghem) code, binary convolutional code (BCC), and/or any other type of ECC and/or FEC code and/or combination thereof, etc. Note that more than one type of ECC and/or FEC code may be used in any of various implementations including concatenation (e.g., first ECC and/or FEC code followed by second ECC and/or FEC code, etc. such as based on an inner code/outer code architecture, etc.), parallel architecture (e.g., such that first ECC and/or FEC code operates on first bits while second ECC and/or FEC code operates on second bits, etc.), and/or any combination thereof. The one or more coded bits may then undergo modulation or symbol mapping to generate modulation symbols. The modulation symbols may include data intended for one or more recipient devices. Note that such modulation symbols may be generated using any of various types of modulation coding techniques. Examples of such modulation coding techniques may include binary phase shift keying (BPSK), quadrature phase shift keying (QPSK), 8-phase shift keying (PSK), 16 quadrature amplitude modulation (QAM), 32 amplitude and phase shift keying (APSK), etc., uncoded modulation, and/or any other desired types of modulation including higher ordered modulations that may include even greater number of constellation points (e.g., 1024 QAM, etc.).

FIG. 4B is a diagram illustrating another example 402 of OFDM and/or OFDMA. A transmitting device transmits modulation symbols via the sub-carriers. Note that such modulation symbols may include data modulation symbols, pilot modulation symbols (e.g., for use in channel estimation, characterization, etc.) and/or other types of modulation symbols (e.g., with other types of information included therein). OFDM and/or OFDMA modulation may operate by performing simultaneous transmission of a large number of narrowband carriers (or multi-tones). In some applications, a guard interval (GI) or guard space is sometimes employed between the various OFDM symbols to try to minimize the effects of ISI (Inter-Symbol Interference) that may be caused by the effects of multi-path within the communication system, which can be particularly of concern in wireless communication systems. In addition, a cyclic prefix (CP) and/or cyclic suffix (CS) (shown in right hand side of FIG. 4A) that may be a copy of the CP may also be employed within the guard interval to allow switching time (e.g., such as when jumping to a new communication channel or sub-channel) and to help maintain orthogonality of the OFDM and/or OFDMA symbols. Generally speaking, an OFDM and/or OFDMA system design is based on the expected delay spread within the communication system (e.g., the expected delay spread of the communication channel).

In a single-user system in which one or more OFDM symbols or OFDM packets/frames are transmitted between a transmitter device and a receiver device, all of the sub-carriers or tones are dedicated for use in transmitting modulated data between the transmitter and receiver devices. In a multiple user system in which one or more OFDM symbols or OFDM packets/frames are transmitted between a transmitter device and multiple recipient or receiver devices, the various sub-carriers or tones may be mapped to different respective receiver devices as described below with respect to FIG. 4C.

FIG. 4C is a diagram illustrating another example 403 of OFDM and/or OFDMA. Comparing OFDMA to OFDM, OFDMA is a multi-user version of the popular orthogonal frequency division multiplexing (OFDM) digital modulation scheme. Multiple access is achieved in OFDMA by assigning subsets of sub-carriers to individual recipient devices or users. For example, first sub-carrier(s)/tone(s) may be assigned to a user 1, second sub-carrier(s)/tone(s) may be assigned to a user 2, and so on up to any desired number of users. In addition, such sub-carrier/tone assignment may be dynamic among different respective transmissions (e.g., a first assignment for a first packet/frame, a second assignment for second packet/frame, etc.). An OFDM packet/frame may include more than one OFDM symbol. Similarly, an OFDMA packet/frame may include more than one OFDMA symbol. In addition, such sub-carrier/tone assignment may be dynamic among different respective symbols within a given packet/frame or superframe (e.g., a first assignment for a first OFDMA symbol within a packet/frame, a second assignment for a second OFDMA symbol within the packet/frame, etc.). Generally speaking, an OFDMA symbol is a particular type of OFDM symbol, and general reference to OFDM symbol herein includes both OFDM and OFDMA symbols (and general reference to OFDM packet/frame herein includes both OFDM and OFDMA packets/frames, and vice versa). FIG. 4C shows example 403 where the assignments of sub-carriers to different users are intermingled among one another (e.g., sub-carriers assigned to a first user includes non-adjacent sub-carriers and at least one sub-carrier assigned to a second user is located in between two sub-carriers assigned to the first user). The different groups of sub-carriers associated with each user may be viewed as being respective channels of a plurality of channels that compose all of the available sub-carriers for OFDM signaling.

FIG. 4D is a diagram illustrating another example 404 of OFDM and/or OFDMA. In this example 404, the assignments of sub-carriers to different users are located in different groups of adjacent sub-carriers (e.g., first sub-carriers assigned to a first user include first adjacently located sub-carrier group, second sub-carriers assigned to a second user include second adjacently located sub-carrier group, etc.). The different groups of adjacently located sub-carriers associated with each user may be viewed as being respective channels of a plurality of channels that compose all of the available sub-carriers for OFDM signaling.

FIG. 4E is a diagram illustrating an example 405 of single-carrier (SC) signaling. SC signaling, when compared to OFDM signaling, includes a singular relatively wide channel across which signals are transmitted. In contrast, in OFDM, multiple narrowband sub-carriers or narrowband sub-channels span the available frequency range, bandwidth, or spectrum across which signals are transmitted within the narrowband sub-carriers or narrowband sub-channels.

Generally, a communication device may be configured to include a processor and the communication interface configured to process received OFDM or OFDMA symbols and/or frames (and/or SC symbols and/or frames) and to generate such OFDM or OFDMA symbols and/or frames (and/or SC symbols and/or frames). At least one of the processor or the communication interface is configured to process received OFDM or OFDMA symbols and/or frames (and/or SC symbols and/or frames) and to generate such OFDM or OFDMA symbols and/or frames (and/or SC symbols and/or frames).

FIG. 5A is a diagram illustrating another example of selection among different OFDM/A frame structures for use in communications between wireless communication devices and specifically showing OFDM/A frame structures corresponding to one or more resource units (RUs). This diagram has some similarities to FIG. 3D and also shows how each OFDM/A frame structure is associated with one or more RUs. Note that these various examples may include different total numbers of sub-carriers, different numbers of data sub-carriers, different numbers of pilot sub-carriers, etc. Different RUs may also have different other characteristics (e.g., different spacing between the sub-carriers, different sub-carrier densities, implemented within different frequency bands, etc.).

In one example, OFDM/A frame structure 1 351 is composed of at least one RU 1 551. In one example, OFDM/A frame structure 1 351 is composed of at least one RU 1 551 and at least one RU 2 552. In another example, OFDM/A frame structure 1 351 is composed of at least one RU 1 551, at least one RU 2 552, and at least one RU m 553. Similarly, the OFDM/A frame structure 2 352 up through OFDM/A frame structure n 353 may be composed of any combinations of the various RUs (e.g., including any one or more RU selected from the RU 1 551 through RU m 553).

FIG. 5B is a diagram illustrating an example of various types of different resource units (RUs). In this example 502, RU 1 551 includes A1 total sub-carrier(s), A2 data (D) sub-carrier(s), A3 pilot (P) sub-carrier(s), and A4 unused sub-carrier(s). RU 2 552 includes B1 total sub-carrier(s), B2 D sub-carrier(s), B3 P sub-carrier(s), and B4 unused sub-carrier(s). RU N 553 includes C1 total sub-carrier(s), C2 D sub-carrier(s), C3 P sub-carrier(s), and C4 unused sub-carrier(s).

Considering the various RUs (e.g., across RU 1 551 to RU N 553), the total number of sub-carriers across the RUs increases from RU 1 551 to RU N 553 (e.g., A1<B1<C1). Also, considering the various RUs (e.g., across RU 1 551 to RU N 553), the ratio of pilot sub-carriers to data sub-carriers across the RUs decreases from RU 1 551 to RU N 553 (e.g., A3/A2>B3/B2>C3/C2).

In some examples, note that different RUs can include a different number of total sub-carriers and a different number of data sub-carriers while including a same number of pilot sub-carriers (e.g., a first RU can include a first number of total sub-carriers, a first number of data sub-carriers, and a number of pilot sub-carriers while a second RU can include a second number of total sub-carriers, a second number of data sub-carriers, and that same number of pilot sub-carriers).

As can be seen, this disclosure presents various options for mapping of data and pilot sub-carriers (and sometimes unused sub-carriers that include no modulation data or are devoid of modulation data) into OFDMA frames or packets (note that frame and packet may be used interchangeably herein) in various communications between communication devices including both the uplink (UL) and downlink (DL) such as with respect to an access point (AP). Note that a user may generally be understood to be a wireless communication device implemented in a wireless communication system (e.g., a wireless station (STA) or an access point (AP) within a wireless local area network (WLAN/WiFi)). For example, a user may be viewed as a given wireless communication device (e.g., a wireless station (STA) or an access point (AP), or an AP-operative STA within a wireless communication system). This disclosure discussed localized mapping and distributed mapping of such sub-carriers or tones with respect to different users in an OFDMA context (e.g., such as with respect to FIG. 4C and FIG. 4D).

Some versions of the IEEE 802.11 standard have the following physical layer (PHY) fast Fourier transform (FFT) sizes: 32, 64, 128, 256, 512.

These PHY FFT sizes are mapped to different bandwidths (BWs) (e.g., which may be achieved using different down-clocking ratios or factors applied to a first clock signal to generate different other clock signals such as a second clock signal, a third clock signal, etc.). In many locations, this disclosure refers to FFT sizes instead of BW since FFT size determines a user's specific allocation of sub-carriers, RUs, etc. and the entire system BW using one or more mappings of sub-carriers, RUs, etc.

This disclosure presents various ways by which the mapping of N users's data into the system BW tones (localized or distributed). For example, if the system BW uses 256 FFT, modulation data for 8 different users can each use a 32 FFT, respectively. Alternatively, if the system BW uses 256 FFT, modulation data for 4 different users can each use a 64 FFT, respectively. In another alternative, if the system BW uses 256 FFT, modulation data for 2 different users can each use a 128 FFT, respectively. Also, any number of other combinations are possible with unequal BW allocated to different users such as 32 FFT to 2 users, 64 FFT for one user, and 128 FFT for the last user.

Localized mapping (e.g., contiguous sub-carrier allocations to different users such as with reference to FIG. 4D) is preferable for certain applications such as low mobility users (e.g., that remain stationary or substantially stationary and whose location does not change frequently) since each user can be allocated to a sub-band based on at least one characteristic. An example of such a characteristic includes allocation to a sub-band that maximizes its performance (e.g., highest SNR or highest capacity in multi-antenna system). The respective wireless communication devices (users) receive frames or packets (e.g., beacons, null data packet (NDP), data, etc. and/or other frame or packet types) over the entire band and feedback their preferred sub-band or a list of preferred sub-bands. Alternatively, a first device (e.g., transmitter, AP, or STA) transmits at least one OFDMA packet to a second communication device, and the second device (e.g., receiver, a STA, or another STA) may be configured to measure the first device's initial transmission occupying the entire band and choose a best/good or preferable sub-band. The second device can be configured to transmit the selection of the information to the first device via feedback, etc.

In some examples, a device is configured to employ PHY designs for 32 FFT, 64 FFT and 128 FFT as OFDMA blocks inside of a 256 FFT system BW. When this is done, there can be some unused sub-carriers (e.g., holes of unused sub-carriers within the provisioned system BW being used). This can also be the case for the lower FFT sizes. In some examples, when an FFT is an integer multiple of another, the larger FFT can be a duplicate a certain number of times of the smaller FFT (e.g., a 512 FFT can be an exact duplicate of two implementations of 256 FFT). In some examples, when using 256 FFT for system BW the available number of tones is 242 that can be split among the various users that belong to the OFDMA frame or packet (DL or UL).

In some examples, a PHY design can leave gaps of sub-carriers between the respective wireless communication devices (users) (e.g., unused sub-carriers). For example, users 1 and 4 may each use a 32 FFT structure occupying a total of 26×2=52 sub-carriers, user 2 may use a 64 FFT occupying 56 sub-carriers and user 3 may use 128 FFT occupying 106 sub-carriers adding up to a sum total of 214 sub-carriers leaving 28 sub-carriers unused.

In another example, only 32 FFT users are multiplexed allowing up to 9 users with 242 sub-carriers–(9 users×26 RUs)=8 unused sub-carriers between the users. In yet another example, four 64 FFT users are multiplexed with 242 sub-carriers–(4 users×56 RUs)=18 unused sub-carriers.

The unused sub-carriers can be used to provide better separation between users especially in the UL where users's energy can spill into each other due to imperfect time/frequency/power synchronization creating inter-carrier interference (ICI).

In some examples that seek to improve flexibility and allow for full sub-carrier utilization for DL and UL OFDMA, a novel modular design is proposed herein that uses a minimum building block to derive flexible number of BW. While the size of the building block can be chosen to be any number, note that the current IEEE 802.11 (e.g., various versions of IEEE 802.11 are referred to below as 11n for IEEE 802.11n, 11 ac for IEEE 802.11ac, etc.) has designs for the following:

32 FFT–24 data sub-carriers=12×2
64 FFT–48 data sub-carriers (11a)–12×4, 52 data sub-carriers (11n,11ac) 12×4+4
128 FFT–108 data sub-carriers (11n,11ac,11af)=12×9
216 data sub-carriers (11af)=12×18
432 data sub-carriers (11af)=12×36
256 FFT–234 data sub-carriers 12×19+6 (12×19.5)
512 FFT–468 data sub-carriers 12×39

Note that using 12 as a basic unit makes sense in terms of leveraging previous designs and current 0.11 design include 12×[2, 4, 9, 18, 36, 39] sub-carriers.

Also note that although designing for all possible BW 12×[1, 2, 3, . . . 40] can provide the relatively highest flexibility. Note also that within applications where an increase in complexity may be undesirable, a subset of these BW can be sufficient to provide for acceptable performance.

Also note that if user allocations span 2 symbols for 256 FFT (234 data sub-carriers) then a whole number of groups, namely 39 groups of 6 sub-carriers per symbol can be used. Note that allocations crossing symbol boundaries are already used in 802.11 systems in conjunction with LDPC codes.

Similarly with 64 FFT (52 data sub-carriers), if allocations span 3 symbols then a whole number of groups, namely 13 groups of 4 sub-carriers per symbol can be used.

Given the available configurations, the following example in this disclosure proposes to add the following new configurations (highlighted in bold) 12×[1, 2, 4, 9, 13, 18, 19.5, 26, 36 39] (e.g., 1, 13, and 26 are added) as balancing added implementation complexity with the addition of improved per-user BW flexibility.

Addition of these options includes defining new values for the interleaver parameters [Ncol, Nrot] for binary convolutional code (BCC) encoding and the sub-carrier mapping distance parameter Dtm for low density parity check (LDPC) encoding.

A slightly smaller size (e.g., alternative 10 MHz design) is based on instead transforming 4×26+4=108 sub-carriers into a channel structure having 102 sub-carriers for data+6 sub-carriers for pilots. This structure enables two large users but similarly to 4×26 requires a new design. Note that such a design for 102 sub-carriers for data may be used for certain legacy wireless communication devices (e.g., those compliant with IEEE 802.11ac) with a change made by replacing Ncol=18 with Ncol=17. Such an alternative design may include 106 sub-carriers that include 102 data sub-carriers and 4 pilot sub-carriers.

FIG. 6A is a diagram illustrating another example 601 of various types of different RUs. In this example 601, RU 1 includes X1 total sub-carrier(s), X2 data (D) sub-carrier(s), X3 pilot (P) sub-carrier(s), and X4 unused sub-carrier(s). RU 2 includes Y1 total sub-carrier(s), Y2 D sub-carrier(s), Y3 P sub-carrier(s), and Y4 unused sub-carrier(s). RU q includes Z1 total sub-carrier(s), Z2 D sub-carrier(s), Z3 P sub-carrier(s), and Z4 unused sub-carrier(s). In this example 601, note that different RUs can include different spacing between the sub-carriers, different sub-carrier densities, implemented within different frequency bands, span different ranges within at least one frequency band, etc.

FIG. 6B is a diagram illustrating another example 602 of various types of different RUs. This diagram shows RU 1 that includes 26 contiguous sub-carriers that include 24 data sub-carriers, and 2 pilot sub-carriers; RU 2 that includes 52 contiguous sub-carriers that include 48 data sub-carriers, and 4 pilot sub-carriers; RU 3 that includes 106 contiguous sub-carriers that include 102 data sub-carriers, and 4 pilot sub-carriers; RU 4 that includes 242 contiguous sub-carriers that include 234 data sub-carriers, and 8 pilot sub-carriers; RU 5 that includes 484 contiguous sub-carriers that include 468 data sub-carriers, and 16 pilot sub-carriers; and RU 6 that includes 996 contiguous sub-carriers that include 980 data sub-carriers, and 16 pilot sub-carriers.

Note that RU 2 and RU 3 include a first/same number of pilot sub-carriers (e.g., 4 pilot sub-carriers each), and RU 5 and RU 6 include a second/same number of pilot sub-carriers (e.g., 16 pilot sub-carriers each). The number of pilot sub-carriers remains same or increases across the RUs. Note also that some of the RUs include an integer multiple number of sub-carriers of other RUs (e.g., RU 2 includes 52 total sub-carriers, which is 2× the 26 total sub-carriers of RU 1, and RU 5 includes 242 total sub-carriers, which is 2× the 242 total sub-carriers of RU 4).

FIG. 6C is a diagram illustrating an example 603 of various types of communication protocol specified physical layer (PHY) fast Fourier transform (FFT) sizes. The device 310 is configured to generate and transmit OFDMA packets based on various PHY FFT sizes as specified within at least one communication protocol. Some examples of PHY FFT sizes, such as based on IEEE 802.11, include PHY FFT sizes such as 32, 64, 128, 256, 512, 1024, and/or other sizes.

In one example, the device 310 is configured to generate and transmit an OFDMA packet based on RU 1 that includes 26 contiguous sub-carriers that include 24 data sub-carriers, and 2 pilot sub-carriers and to transmit that OFDMA packet based on a PHY FFT 32 (e.g., the RU 1 fits within the PHY FFT 32). In one example, the device 310 is configured to generate and transmit an OFDMA packet based on RU 2 that includes 52 contiguous sub-carriers that include 48 data sub-carriers, and 4 pilot sub-carriers and to transmit that OFDMA packet based on a PHY FFT 56 (e.g., the RU 2 fits within the PHY FFT 56). The device 310 uses other sized RUs for other sized PHY FFTs based on at least one communication protocol.

Note also that any combination of RUs may be used. In another example, the device 310 is configured to generate and transmit an OFDMA packet based on two RUs based on RU 1 and one RU based on RU 2 based on a PHY FFT 128 (e.g., two RUs based on RU 1 and one RU based on RU 2 includes a total of 104 sub-carriers). The device 310 is configured to generate and transmit any OFDMA packets based on any combination of RUs that can fit within an appropriately selected PHY FFT size of at least one communication protocol.

Note also that any given RU may be sub-divided or partitioned into subsets of sub-carriers to carry modulation data for one or more users (e.g., such as with respect to FIG. 4C or FIG. 4D).

FIG. 7A is a diagram illustrating an example 701 of different channel bandwidths and relationship there between. In one example, a device (e.g., the device 310) is configured to generate and transmit any OFDMA packet based on any of a number of OFDMA frame structures within various communication channels having various channel bandwidths. For example, a 160 MHz channel may be subdivided into two 80 MHz channels. A 80 MHz channel may be subdivided into two 40 MHz channels. A 40 MHz channel may be subdivided into two 20 MHz channels. Note also such channels may be located within the same frequency band, the same frequency sub-band or alternatively among different frequency bands, different frequency sub-bands, etc.

FIG. 7B is a diagram illustrating an example 702 of different OFDM/A packets based on different OFDM/A frame structures with placement of one or more unused sub-carriers therein. This diagram shows an OFDM/A structure in which one or more unused sub-carriers is/are interspersed among one or more RUs. In this example 702, at least one unused sub-carrier (e.g., a sub-carrier that is devoid of any modulation data) is located in between a first at least one RU (shown as RU A, which includes one or more RUs) and a second at least one RU (shown as RU B (or A), which includes one or more RUs). Also, in this example 702, a first at least one unused sub-carrier is also adjacently located to the first at least one RU (shown as RU A, which includes one or more RUs), and a second at least one unused sub-carrier is also adjacently located to the second at least one RU (shown as RU B (or A), which includes one or more RUs).

Note that the RU A and RU B may have some similar and/or different characteristics (e.g., include different numbers of sub-carriers, have different spacing between the sub-carriers, have different densities of sub-carriers, be integer multiples of sizes and/or numbers of sub-carriers, be non-integer multiples of sizes and/or numbers of sub-carriers, etc.).

FIG. 7C is a diagram illustrating another example 703 of different OFDM/A packets based on different OFDM/A frame structures with placement of one or more unused sub-carriers therein. This diagram also shows an OFDM/A structure in which one or more unused sub-carriers is/are interspersed among one or more RUs. In this example 703, a first at least one unused sub-carrier (e.g., a sub-carrier that is devoid of any modulation data) is located in between at least one RU (shown as RU A, which includes one or more RUs) and a first band edge of a frequency band (or channel, or bandwidth, or sub-carriers, etc.), and a second at least one unused sub-carrier is located in between at least one RU (shown as RU A, which includes one or more RUs) and a second band edge of the frequency band (or channel, or bandwidth, or sub-carriers, etc.).

FIG. 8A is a diagram illustrating another example 801 of different OFDM/A packets based on different OFDM/A frame structures with placement of one or more unused sub-carriers therein. This diagram also shows an OFDM/A structure in which one or more unused sub-carriers is/are interspersed among one or more RUs. In this example 801, a first at least one unused sub-carrier (e.g., a sub-carrier that is devoid of any modulation data) is located at DC (e.g., at or near the sub-carrier or tone index of 0 in which indices increase towards the right hand side (RHS) of the diagram and indices decrease towards the left hand side (LHS) of the diagram). In some examples, the placement of at least one unused sub-carrier at or near DC can help mitigate or reduce any deleterious effects (e.g., noise, interference, inter-modulation products, etc.) caused by a local oscillator (LO) implemented within a device.

FIG. 8B is a diagram illustrating another example 802 of communication between wireless communication devices. In this diagram, a device (e.g., the device 310) generates and transmits a first OFDM/A packet based on a first OFDM/A frame structure. The first OFDM/A packet is based on a first one or more RUs and a first one or more unused sub-carriers within a first one or more channel of a first one or more frequency band at or during a time 1. The device 310 then generates and transmits an $n^{th}$ OFDM/A packet based on an $n^{th}$ OFDM/A frame structure. The $n^{th}$ OFDM/A packet is based on an $n^{th}$ one or more RUs and an $n^{th}$ one or more unused sub-carriers within an $n^{th}$ one or more channel of an $n^{th}$ one or more frequency band at or during a time n. In general, the device 310 is configured to generate different respective OFDM/A packet having different characteristics at or during different times based on any of a number of considerations.

Note also that while various examples are described herein with respect to generation and transmission of OFDMA packets, other examples of devices can operate and be configured to receive and process various OFDMA packets. A device is configured to perform corresponding reception and processing operations (e.g., reverse operations related to any generation and transmission operations described within any of the embodiments, examples, etc. herein). In general, a device (e.g., the device 310) is configured to perform adaptation among and between the various OFDM/A frame structures based on any one or more considerations.

New and developing IEEE 802.11 standards, communication protocols, and/or recommended practices (e.g., including the developing IEEE 802.11ax) may be configured to use a longer symbol than prior IEEE 802.11 standards, communication protocols, and/or recommended practices (e.g., four time, 4×, longer symbol). A device (e.g., device 310) may be configured to use larger fast Fourier transform (FFT) sizes (e.g., 1024 FFT and 2048 FFT designs) in order to support broader channel sizes (e.g., such as 80M Hz and 160 MHz channels, which may be composed on at least one sub-channel, such as multiple 20 MHz channels as shown with reference to FIG. 7A).

A device (e.g., device 310) may be configured to use a 2048 FFT that is a duplicate of the 1024 FFT. The 2048 FFT can be a duplicate of the 1024 FFT so as to also support 80+80 BW (e.g., 2 80 MHz channels) configurations with minimum changes relative to prior IEEE 802.11 standards, communication protocols, and/or recommended practices (e.g., IEEE 802.11ac). Note, however, that this may potentially create a larger gap than necessary around DC. As such, in OFDM and/or OFDMA communications, these unused sub-carriers or tones can be utilized for other purposes. Such purposes may include increasing separation between RUs of a multiple RU implementation, maintaining separation between an RU and a band edge, etc.

For example, for the design of 1024 FFT, certain configurations may be used to keep a certain number of guard sub-carriers or tones (e.g., 6 guard sub-carriers or tones) throughout 40, 80, 160 MHz channels and to continue into the next higher FFT size. Considering one possible example, this may lead to the implication that a 1024 FFT symbol should utilize 1010 tones for transmission [−506 −2 2 506].

Some designs may also assume that the number of pilot sub-carriers or tones increases by a factor of 2 with every doubling of FFT size, and can use at least 12 fixed pilots for phase tracking.

Note, however, that traveling pilots (e.g., such as described with respect to FIG. 5) may require higher density in order to estimate channels that have Doppler effects, and this pilot density may be selected not be much lower than the one in 256 FFT, which leads to a choice of 32 pilots.

This disclosure presents to place a restriction on data tones number being a multiple of 12 to prevent unsupported modulation coding set (MCS) the available choices are as follows (note that unused tones can be used to increase gap around DC, bandwidth, and/or channel edges such as with reference to FIG. 8A or other diagrams herein):

In some alternative examples, a slightly smaller size (e.g., alternative 10 MHz design) is based on instead transforming 4×26+4=108 sub-carriers into a channel structure having 102 sub-carriers for data +6 sub-carriers for pilots. This structure enables two large users but similarly to 4×26 requires a new design. Note that such a design for 102 sub-carriers for data may be used for certain legacy wireless communication devices (e.g., those compliant with IEEE 802.11ac) with a change made by replacing Ncol=18 with Ncol=17. Such an alternative design may include 106 sub-carriers that include 102 data sub-carriers and 4 pilot sub-carriers.

Some alternative examples that are operative based on a 1024 FFT are provided below.

1. 996 data sub-carriers+12 pilot sub-carriers=1008 sub-carriers (other numbers for pilot sub-carriers are possible around 12 to 14)

2. 984 data sub-carriers+24 pilot sub-carriers=1008 sub-carriers (other numbers for pilot sub-carriers are possible around 24)

3. 972 data sub-carriers+32 pilot sub-carriers=1004 sub-carriers (other numbers for pilot sub-carriers are possible around 32)

Figures 9A, 9B:
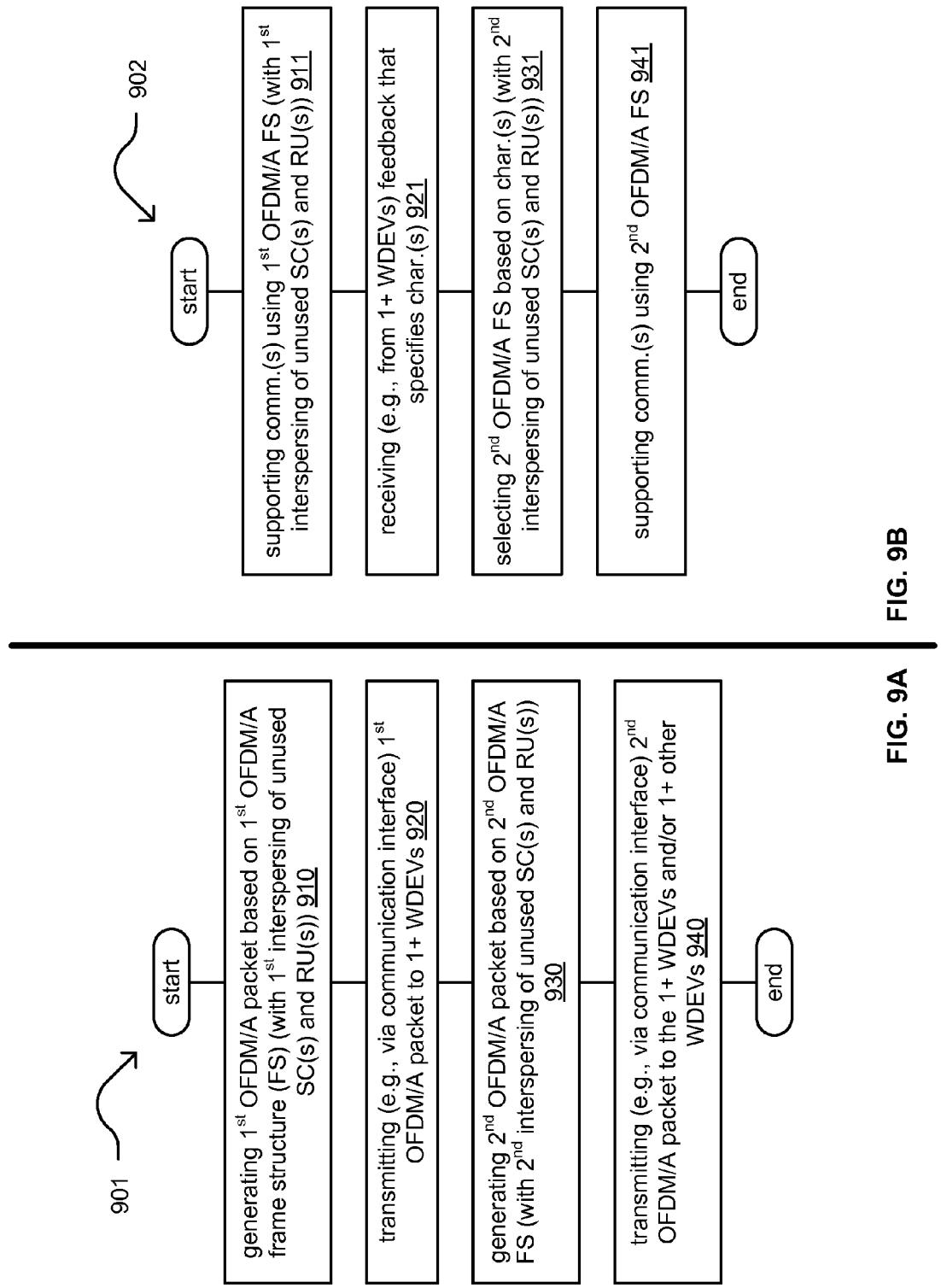
FIG. 9A is a diagram illustrating an embodiment of a method for execution by one or more wireless communication devices.
FIG. 9B is a diagram illustrating another embodiment of a method for execution by one or more wireless communication devices.

FIG. 9A is a diagram illustrating an embodiment of a method 901 for execution by one or more wireless communication devices. The method 901 begins by generating a first orthogonal frequency division multiple access (OFDMA) packet based on a first OFDMA frame structure of a plurality of OFDMA frame structures (block 910). The first OFDMA frame structure includes a first interspersing of one or more RUs with one or more unused sub-carriers. In some examples, the first OFDMA packet includes data modulated within the first data sub-carriers and intended for a first other wireless communication device. The method 901 continues by transmitting (e.g., via a communication interface of the wireless communication device) the first OFDMA packet to the first other wireless communication device (block 920).

The method 901 then operates by generating a second OFDMA packet based on a second OFDMA frame structure of the plurality of OFDMA frame structures (block 930). The second OFDMA frame structure includes a second interspersing of one or more RUs with one or more unused sub-carriers. The second interspersing may have some characteristics that are similar to the first interspersing (e.g., include one or more unused sub-carriers between RUs, at DC, and/or at band/channel/bandwidth/frequency band edges, etc.). The method 901 continues by transmitting (e.g., via the communication interface of the wireless communication device) the second OFDMA packet to at least one of the first other wireless communication device or a second other wireless communication device (block 940).

FIG. 9B is a diagram illustrating another embodiment of a method 902 for execution by one or more wireless communication devices. The method 902 begins by supporting communications using a first OFDMA frame structure (block 911). In some examples, this can include generating a first OFDMA packet based on a first OFDMA frame structure and transmitting the first OFDMA packet to at least one other wireless communication device. The first OFDMA frame structure includes a first interspersing of one or more RUs with one or more unused sub-carriers. In some examples, the first OFDMA packet includes data modulated within first data sub-carriers and intended for a first other wireless communication device.

The method 902 continues by receiving, from the at least one other wireless communication device, feedback that specifies at least one characteristic that corresponds to at least one wireless communication channel between the wireless communication device and the at least one other wireless communication device (block 921).

The method 902 then operates by selecting a second OFDMA frame structure based on the at least one characteristic (block 931). The second OFDMA frame structure includes a second interspersing of one or more RUs with one or more unused sub-carriers. In some examples, the second OFDMA packet includes first data modulated within a first set of data sub-carriers and intended for the first other wireless communication device and second data modulated within a second set of data sub-carriers and intended for a second other wireless communication device (e.g., such as based on FIG. 4B or FIG. 4D).

The method 902 continues by supporting communications using the second OFDMA frame structure (block 941). In some examples, this can include generating a second OFDMA packet based on the second OFDMA frame structure and transmitting the second OFDMA packet to the first other wireless communication device and the second other wireless communication device.

It is noted that the various operations and functions described within various methods herein may be performed within a wireless communication device (e.g., such as by the processor 330, communication interface 320, and memory 340 as described with reference to FIG. 3A) and/or other components therein. Generally, a communication interface and processor in a wireless communication device can perform such operations.

Examples of some components may include one of more baseband processing modules, one or more media access control (MAC) layer components, one or more physical layer (PHY) components, and/or other components, etc. For example, such a processor can perform baseband processing operations and can operate in conjunction with a radio, analog front end (AFE), etc. The processor can generate such signals, packets, frames, and/or equivalents etc. as described herein as well as perform various operations described herein and/or their respective equivalents.

In some embodiments, such a baseband processing module and/or a processing module (which may be implemented in the same device or separate devices) can perform such processing to generate signals for transmission to another wireless communication device using any number of radios and antennae. In some embodiments, such processing is performed cooperatively by a processor in a first device and another processor within a second device. In other embodiments, such processing is performed wholly by a processor within one device.

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "configured to," "operably coupled to," "coupled to," and/or "coupling" includes direct coupling between items and/or indirect coupling between items via an intervening item (e.g., an item includes, but is not limited to, a component, an element, a circuit, and/or a module) where, for an example of indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "configured to," "operable to," "coupled to," or "operably coupled to" indicates that an item includes one or more of power connections, input(s), output(s), etc., to perform, when activated, one or more its corresponding functions and may further include inferred coupling to one or more other items. As may still further be used herein, the term "associated with," includes direct and/or indirect coupling of separate items and/or one item being embedded within another item.

As may be used herein, the term "compares favorably" or equivalent, indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

As may also be used herein, the terms "processing module," "processing circuit," "processor," and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may be, or further include, memory and/or an integrated memory element, which may be a single memory device, a plurality of memory devices, and/or embedded circuitry of another processing module, module, processing circuit, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the Figures. Such a memory device or memory element can be included in an article of manufacture.

One or more embodiments of an invention have been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by discrete components, application specific integrated circuits, processors executing appropriate software and the like or any combination thereof.

The one or more embodiments are used herein to illustrate one or more aspects, one or more features, one or more concepts, and/or one or more examples of the invention. A physical embodiment of an apparatus, an article of manufacture, a machine, and/or of a process may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of one or more of the embodiments. A module includes a processing module, a processor, a functional block, hardware, and/or memory that stores operational instructions for performing one or more functions as may be described herein. Note that, if the module is implemented via hardware, the hardware may operate independently and/or in conjunction with software and/or firmware. As also used herein, a module may contain one or more sub-modules, each of which may be one or more modules.

While particular combinations of various functions and features of the one or more embodiments have been expressly described herein, other combinations of these features and functions are likewise possible. The present disclosure of an invention is not limited by the particular examples disclosed herein and expressly incorporates these other combinations.

What is claimed is:

1. A wireless communication device comprising:
   a communication interface; and
   a processor, at least one of the processor or the communication interface configured to:
   support communications based on any of a plurality of orthogonal frequency division multiple access (OFDMA) frame structures, wherein a ratio of pilot sub-carriers to data sub-carriers across resource units (RUs) of the plurality of OFDMA frame structures decreases as total sub-carriers across the RUs of the plurality of OFDMA frame structures increases;
   generate an OFDMA packet based on an OFDMA frame structure of the plurality of OFDMA frame structures that includes a set of RUs and a set of unused sub-carriers that are devoid of modulation data, wherein at least some RUs of the set of RUs include a respective common number of contiguous sub-carriers, and wherein the set of unused sub-carriers are interspersed with the set of RUs; and
transmit the OFDMA packet to at least one other wireless communication device.

2. The wireless communication device of claim 1, wherein the at least one of the processor or the communication interface is further configured to:
generate a first OFDMA packet based on a first OFDMA frame structure of the plurality of OFDMA frame structures that includes a first plurality of RUs and a first plurality of unused sub-carriers that are devoid of modulation data, wherein at least some RUs of the first plurality of RUs include a first respective common number of contiguous sub-carriers, wherein the first plurality of unused sub-carriers are interspersed with the first plurality of RUs;
transmit the first OFDMA packet to a first other wireless communication device;
generate a second OFDMA packet based on a second OFDMA frame structure of the plurality of OFDMA frame structures that includes a second plurality of RUs and a second plurality of unused sub-carriers that are devoid of modulation data, wherein at least some RUs of the second plurality of RUs include a second respective common number of contiguous sub-carriers, wherein the second plurality of unused sub-carriers are interspersed with the second plurality of RUs, wherein the second plurality of RUs include fewer RUs than the first plurality of RUs; and
transmit the second OFDMA packet to at least one of the first other wireless communication device or a second other wireless communication device.

3. The wireless communication device of claim 1, wherein the at least one of the processor or the communication interface is further configured to:
generate another OFDMA packet based on another OFDMA frame structure of the plurality of OFDMA frame structures that includes a single RU that includes another number of contiguous sub-carriers; and
transmit the another OFDMA packet to at least one of the at least one other wireless communication device or at least one additional wireless communication device.

4. The wireless communication device of claim 1, wherein the at least one of the processor or the communication interface is further configured to:
generate the OFDMA packet to include a first unused sub-carrier of the set of unused sub-carriers that is adjacent to a first RU of the set of RUs that is adjacent to at least one unused sub-carrier of the set of unused sub-carriers that is adjacent to a second RU of the set of RUs that is adjacent to a second unused sub-carrier of the set of unused sub-carriers.

5. The wireless communication device of claim 1, wherein the at least one of the processor or the communication interface is further configured to:
generate the OFDMA packet to include the set of RUs located within a frequency band, wherein at least one of:
at least one unused sub-carrier of the set of unused sub-carriers is located approximately at DC of the frequency band; or
a first unused sub-carrier of the set of unused sub-carriers is located at a first band edge of the frequency band, and a second unused sub-carrier of the set of unused sub-carriers is located at a second band edge of the frequency band.

6. The wireless communication device of claim 1, wherein the RUs of the plurality of OFDMA frame structures comprise:
a first RU that includes 26 contiguous sub-carriers that include 24 data sub-carriers and 2 pilot sub-carriers;
a second RU that includes 52 contiguous sub-carriers that include 48 data sub-carriers and 4 pilot sub-carriers;
a third RU that includes 106 contiguous sub-carriers that include 102 data sub-carriers and 4 pilot sub-carriers;
a fourth RU that includes 242 contiguous sub-carriers that include 236 data sub-carriers and 8 pilot sub-carriers;
a fifth RU that includes 484 contiguous sub-carriers that include 468 data sub-carriers and 16 pilot sub-carriers; or
a sixth RU that includes 996 contiguous sub-carriers that include 980 data sub-carriers and 16 pilot sub-carriers.

7. The wireless communication device of claim 1, wherein the at least one of the processor or the communication interface is further configured to:
generate a first OFDMA packet based on a first OFDMA frame structure of the plurality of OFDMA frame structures that includes a first resource unit (RU) that includes first contiguous sub-carriers that include first data sub-carriers and first pilot sub-carriers;
generate a second OFDMA packet based on a second OFDMA frame structure of the plurality of OFDMA frame structures that includes a second RU that includes second contiguous sub-carriers that include second data sub-carriers and second pilot sub-carriers, wherein the second RU includes more sub-carriers than the first RU;
generate and transmit the first OFDMA packet based on a first physical layer (PHY) fast Fourier transform (FFT) size as specified within a communication protocol; and
generate and transmit the second OFDMA packet based on a second PHY FFT size that is specified within the communication protocol.

8. The wireless communication device of claim 1 further comprising:
an access point (AP), wherein the at least one other wireless communication device includes a wireless station (STA).

9. A wireless communication device comprising:
a communication interface; and
a processor, at least one of the processor or the communication interface configured to:
support communications based on any of a plurality of orthogonal frequency division multiple access (OFDMA) frame structures, wherein a ratio of pilot sub-carriers to data sub-carriers across resource units (RUs) of the plurality of OFDMA frame structures decreases as total sub-carriers across the RUs of the plurality of OFDMA frame structures increases;
generate a first OFDMA packet based on a first OFDMA frame structure of the plurality of OFDMA frame structures that includes a set of RUs and a set of unused sub-carriers that are devoid of modulation data located within a frequency band, wherein at least some RUs of the set of RUs include a respective common number of contiguous sub-carriers, wherein the set of unused sub-carriers are interspersed with the set of RUs, wherein a first unused sub-carrier of the set of unused sub-carriers is located at a first band edge of the frequency band, and wherein a second unused sub-carrier of the set of unused sub-carriers is located at a second band edge of the frequency band;
transmit the first OFDMA packet to a first other wireless communication device;
generate a second OFDMA packet based on a second OFDMA frame structure of the plurality of OFDMA frame structures that includes a single RU that includes another number of contiguous sub-carriers; and
transmit the second OFDMA packet to at least one of the first other wireless communication device or a second other wireless communication device.

10. The wireless communication device of claim 9, wherein the at least one of the processor or the communication interface is further configured to:
generate the first OFDMA packet to include a first unused sub-carrier of the set of unused sub-carriers that is adjacent to a first RU of the set of RUs that is adjacent to at least one unused sub-carrier of the set of unused sub-carriers that is adjacent to a second RU of the set of RUs that is adjacent to a second unused sub-carrier of the set of unused sub-carriers.

11. The wireless communication device of claim 9, wherein the RUs of the plurality of OFDMA frame structures comprise:
a first RU that includes 26 contiguous sub-carriers that include 24 data sub-carriers and 2 pilot sub-carriers;
a second RU that includes 52 contiguous sub-carriers that include 48 data sub-carriers and 4 pilot sub-carriers;
a third RU that includes 106 contiguous sub-carriers that include 102 data sub-carriers and 4 pilot sub-carriers;
a fourth RU that includes 242 contiguous sub-carriers that include 236 data sub-carriers and 8 pilot sub-carriers;
a fifth RU that includes 484 contiguous sub-carriers that include 468 data sub-carriers and 16 pilot sub-carriers; or
a sixth RU that includes 996 contiguous sub-carriers that include 980 data sub-carriers and 16 pilot sub-carriers.

12. The wireless communication device of claim 9, wherein the at least one of the processor or the communication interface is further configured to:
generate and transmit the first OFDMA packet based on a first physical layer (PHY) fast Fourier transform (FFT) size as specified within a communication protocol; and
generate and transmit the second OFDMA packet based on a second PHY FFT size that is specified within the communication protocol.

13. The wireless communication device of claim 9 further comprising:
an access point (AP), wherein at least one of the first other wireless communication device or the second other wireless communication device includes a wireless station (STA).

14. A method for execution by a wireless communication device, the method comprising:
supporting communications based on any of a plurality of orthogonal frequency division multiple access (OFDMA) frame structures, wherein a ratio of pilot sub-carriers to data sub-carriers across resource units (RUs) of the plurality of OFDMA frame structures decreases as total sub-carriers across the RUs of the plurality of OFDMA frame structures increases;
generating an OFDMA packet based on an OFDMA frame structure of the plurality of OFDMA frame structures that includes a set of RUs and a set of unused sub-carriers that are devoid of modulation data, wherein at least some RUs of the set of RUs include a respective common number of contiguous sub-carriers, and wherein the set of unused sub-carriers are interspersed with the set of RUs; and
transmitting, via a communication interface of the wireless communication device, the OFDMA packet to at least one other wireless communication device.

15. The method of claim 14 further comprising:
generating a first OFDMA packet based on a first OFDMA frame structure of the plurality of OFDMA frame structures that includes a first plurality of RUs and a first plurality of unused sub-carriers that are devoid of modulation data, wherein at least some RUs of the first plurality of RUs include a first respective common number of contiguous sub-carriers, wherein the first plurality of unused sub-carriers are interspersed with the first plurality of RUs;
transmitting, via the communication interface of the wireless communication device, the first OFDMA packet to a first other wireless communication device;
generating a second OFDMA packet based on a second OFDMA frame structure of the plurality of OFDMA frame structures that includes a second plurality of RUs and a second plurality of unused sub-carriers that are devoid of modulation data, wherein at least some RUs of the second plurality of RUs include a second respective common number of contiguous sub-carriers, wherein the second plurality of unused sub-carriers are interspersed with the second plurality of RUs, wherein the second plurality of RUs include fewer RUs than the first plurality of RUs; and
transmitting, via the communication interface of the wireless communication device, the second OFDMA packet to at least one of the first other wireless communication device or a second other wireless communication device.

16. The method of claim 14 further comprising:
generating another OFDMA packet based on another OFDMA frame structure of the plurality of OFDMA frame structures that includes a single RU that includes another number of contiguous sub-carriers; and
transmitting, via the communication interface of the wireless communication device, the another OFDMA packet to at least one of the at least one other wireless communication device or at least one additional wireless communication device.

17. The method of claim 14 further comprising:
generating the OFDMA packet to include the set of RUs located within a frequency band, wherein at least one of:
at least one unused sub-carrier of the set of unused sub-carriers is located approximately at DC of the frequency band;
a first unused sub-carrier of the set of unused sub-carriers is located at a first band edge of the frequency band, and a second unused sub-carrier of the set of unused sub-carriers is located at a second band edge of the frequency band; or
at least one other unused sub-carrier of the set of unused sub-carriers is located in between a first RU of the set of RUs and a second RU of the set of RUs.

18. The method of claim 14, wherein the RUs of the plurality of OFDMA frame structures comprise:
a first RU that includes 26 contiguous sub-carriers that include 24 data sub-carriers and 2 pilot sub-carriers;
a second RU that includes 52 contiguous sub-carriers that include 48 data sub-carriers and 4 pilot sub-carriers;

a third RU that includes 106 contiguous sub-carriers that include 102 data sub-carriers and 4 pilot sub-carriers;
a fourth RU that includes 242 contiguous sub-carriers that include 236 data sub-carriers and 8 pilot sub-carriers;
a fifth RU that includes 484 contiguous sub-carriers that include 468 data sub-carriers and 16 pilot sub-carriers; or
a sixth RU that includes 996 contiguous sub-carriers that include 980 data sub-carriers and 16 pilot sub-carriers.

19. The method of claim 14 further comprising:
generating a first OFDMA packet based on a first OFDMA frame structure of the plurality of OFDMA frame structures that includes a first resource unit (RU) that includes first contiguous sub-carriers that include first data sub-carriers and first pilot sub-carriers;
generating a second OFDMA packet based on a second OFDMA frame structure of the plurality of OFDMA frame structures that includes a second RU that includes second contiguous sub-carriers that include second data sub-carriers and second pilot sub-carriers, wherein the second RU includes more sub-carriers than the first RU;
generating and transmitting the first OFDMA packet based on a first physical layer (PHY) fast Fourier transform (FFT) size as specified within a communication protocol; and
generating and transmitting the second OFDMA packet based on a second PHY FFT size that is specified within the communication protocol.

20. The method of claim 14, wherein the wireless communication device is an access point (AP), and the at least one other wireless communication device includes a wireless station (STA).

* * * * *